(12) United States Patent
Yoshino

(10) Patent No.: US 10,536,596 B2
(45) Date of Patent: Jan. 14, 2020

(54) SUPPORTING MEMBER, IMAGE FORMING APPARATUS, SHEET FEEDING DEVICE, SHEET PROCESSING DEVICE AND IMAGE READING DEVICE

(71) Applicant: CANON KABUSHIKI KAISHA, Tokyo (JP)

(72) Inventor: Daiju Yoshino, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/161,184

(22) Filed: Oct. 16, 2018

(65) Prior Publication Data
US 2019/0116282 A1 Apr. 18, 2019

(30) Foreign Application Priority Data
Oct. 18, 2017 (JP) .................... 2017-202139

(51) Int. Cl.
*F16M 13/02* (2006.01)
*H04N 1/00* (2006.01)
*G03G 21/16* (2006.01)

(52) U.S. Cl.
CPC ........ *H04N 1/00559* (2013.01); *F16M 13/02* (2013.01); *G03G 21/1695* (2013.01); *H04N 1/00615* (2013.01)

(58) Field of Classification Search
USPC ........................................................ 248/300
See application file for complete search history.

(56) References Cited

U.S. PATENT DOCUMENTS

| | | | | |
|---|---|---|---|---|
| 7,140,933 B2 * | 11/2006 | Nakamura | ............. | B63H 20/32 440/77 |
| 2004/0013931 A1 * | 1/2004 | Takamura | ........... | H01M 8/0206 29/623.4 |
| 2004/0183858 A1 * | 9/2004 | Inoue | ..................... | B41J 2/1752 347/49 |
| 2015/0166312 A1 * | 6/2015 | Ishikawa | .................. | B66D 3/26 254/383 |
| 2015/0219134 A1 * | 8/2015 | Yamaguchi | ............... | F16B 5/02 403/11 |
| 2016/0200190 A1 * | 7/2016 | Matsuura | ............... | B60K 15/04 220/86.2 |
| 2016/0316576 A1 * | 10/2016 | Kim | ..................... | H05K 3/0017 |
| 2016/0347083 A1 * | 12/2016 | Ishidate | .................. | B41J 2/471 |

FOREIGN PATENT DOCUMENTS

JP H10-26359 A 1/1998

* cited by examiner

*Primary Examiner* — Monica E Millner
(74) *Attorney, Agent, or Firm* — Venable LLP

(57) ABSTRACT

A supporting member includes a first plate portion including a supporting surface, a first hole, and a female thread portion formed at an inner peripheral surface of the first hole; a second plate portion provided by hemming the metal plate member; a third plate portion provided by bending the metal plate member at one end portion of the second plate portion at substantially a right angle; and a second hole continuing between the second and third plate portions so that the screw threadably engageable with the female thread portion is prevented from interfering with the second and third plate portions. The second and third plate portions provide a bent portion therebetween positioned within a range of a nominal diameter of the female thread portion with respect to a thickness direction of the third plate portion, as seen in a direction perpendicular to the thickness direction.

15 Claims, 13 Drawing Sheets

(a)

(b)

SUPPORTING MEMBER, IMAGE FORMING APPARATUS, SHEET FEEDING DEVICE, SHEET PROCESSING DEVICE AND IMAGE READING DEVICE

FIELD OF THE INVENTION AND RELATED ART

The present invention relates to a supporting member including a female thread portion provided by forming a female screw in a metal plate member, and an image forming apparatus, a sheet feeding device, a sheet processing device and an image reading device which include the supporting member.

Conventionally, an apparatus such as a copying machine, a multi-function machine, a printer or a facsimile machine includes a frame structure for forming a framework of an apparatus main assembly. This frame structure includes a processed metal plate member and has been used for a side plate, a beam or the like. Further, the side, on the beam or the like comprising the metal plate member, another component part such as a substrate or a cover is mounted.

Japanese Laid-Open Patent Application (JP-A) Hei 10-26359 discloses a structure in which a metal plate member used for the side plate, the beam or the like is provided with a cylindrical burring portion formed by subjecting the metal plate member to burring and in which a screw is inserted into the cylindrical burring portion and is fixed in the metal plate member and thus the above-described another component part is mountable on the metal plate member.

In the conventional constitution, as disclosed in JP-A Hei 10-26359, in some cases, the cylindrical portion formed by the burring is subjected to cutting at an inside thereof to form a female thread portion, and a screw is inserted into the formed female thread portion and thus another member is fastened to the metal plate member.

However, in the case where another component part (another member) is mounted on the metal plate member, when the screw is fastened to the metal plate member, by a force exerted on the metal plate member in a screw inserting direction, the metal plate member is deformed so as to be inclined with respect to the screw inserting direction in some instances.

Thus, when the metal plate member is deformed during fastening with the screw, a position of an axis of the screw to be inserted and a position of an axis of the female thread portion are displaced relative to each other, so that there is a liability that the female thread portion is broken in a state in which the screw is inclined with respect to the female thread portion.

SUMMARY OF THE INVENTION

The present invention has been accomplished in view of the above-described problem. A principal object of the present invention is to provide a supporting member (assembling structure) capable of suppressing breakage of a female thread portion due to fastening between a screw and the female thread portion in an inclined state between the screw and the female thread portion by suppressing deformation of a metal plate member due to a force exerted on the metal plate member in a screw inserting direction during fastening of the metal plate member with the screw.

According to an aspect of the present invention, there is provided a supporting member made of a single metal plate member and capable of supporting a member to be supported by being fastened with a screw, the supporting member comprising: a first plate portion including a supporting surface capable of supporting the member to be supported, a first hole formed by burring, and a female thread portion formed at an inner peripheral surface of the first hole so that the screw for fixing the member to be supported is threadably engageable with the female thread portion; a second plate portion provided by hemming the metal plate member so that one surface of the second plate portion contacts a surface of the first plate portion opposite from the supporting surface; a third plate portion provided by bending the metal plate member at one end portion of the second plate portion so that an angle formed between the second plate portion and the third plate portion is substantially a right angle; and a second hole continuing between the second plate portion and the third plate portion so that the screw threadably engageable with the female thread portion is prevented from interfering with the second plate portion and the third plate portion, wherein the second plate portion and the third plate portion provide a bent portion therebetween positioned within a range of a nominal diameter of the female thread portion with respect to a thickness direction of the third plate portion, as seen in a direction perpendicular to the thickness direction.

Further features of the present invention will become apparent from the following description of exemplary embodiments with reference to the attached drawings.

Figure 3:
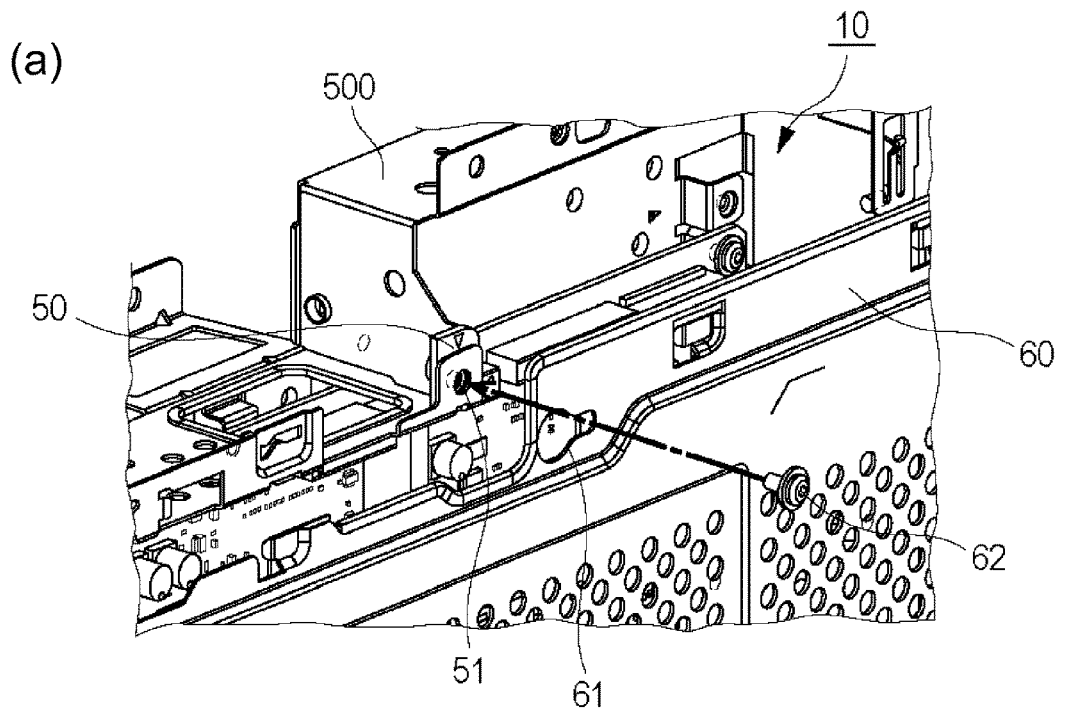
Figure 3:
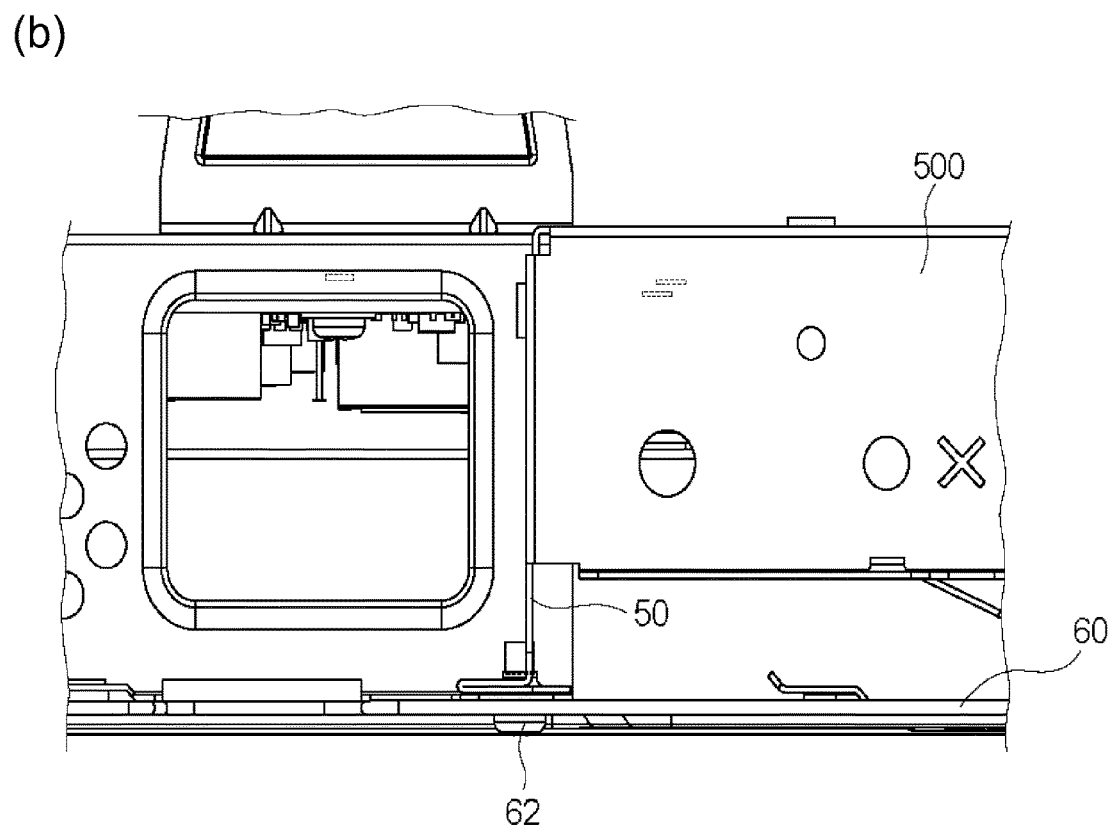

Parts (a) and (b) of FIG. 3 are partially enlarged views showing an assembling structure 8 supporting member) in First Embodiment.

Figure 4:
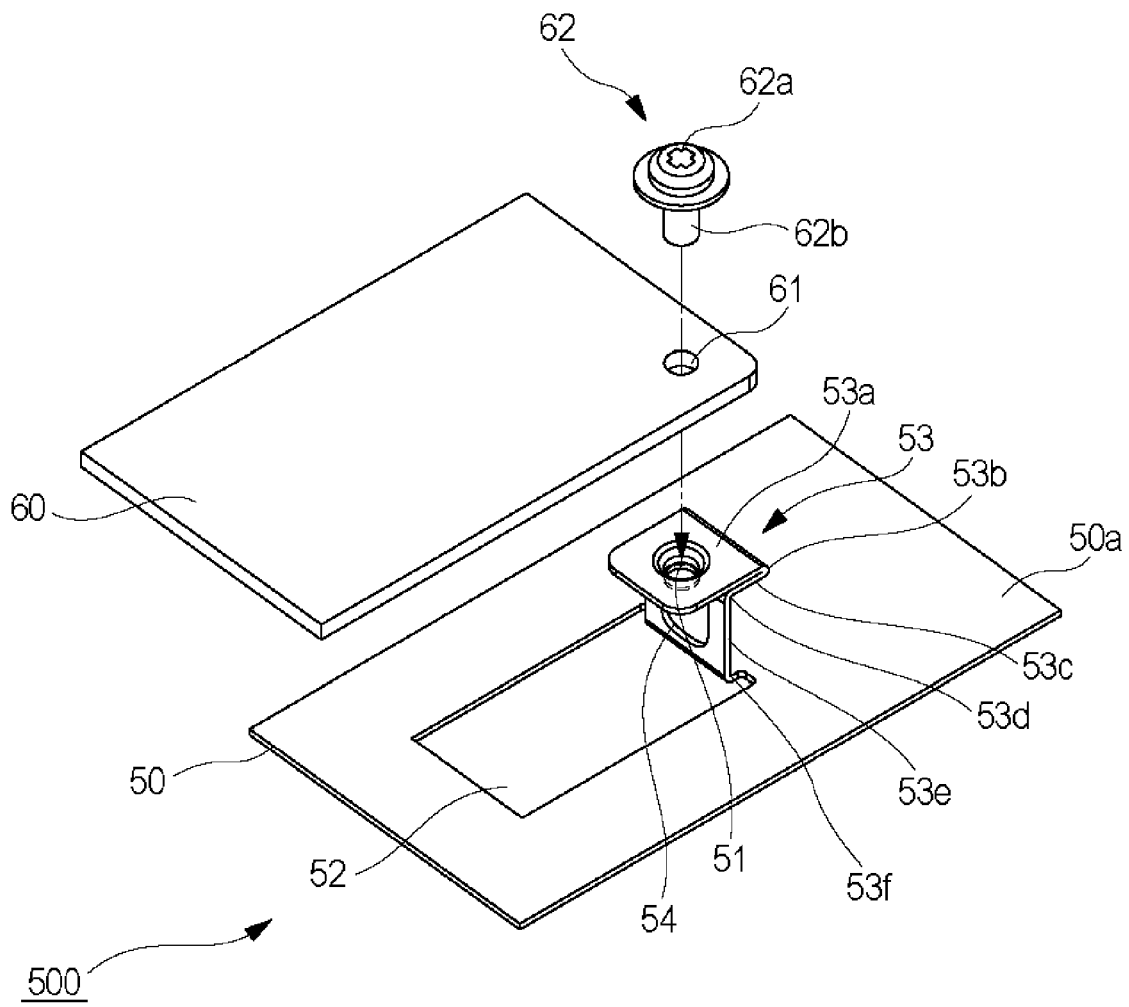

FIG. 4 is a perspective view showing the assembling structure in First Embodiment.

Figure 5:
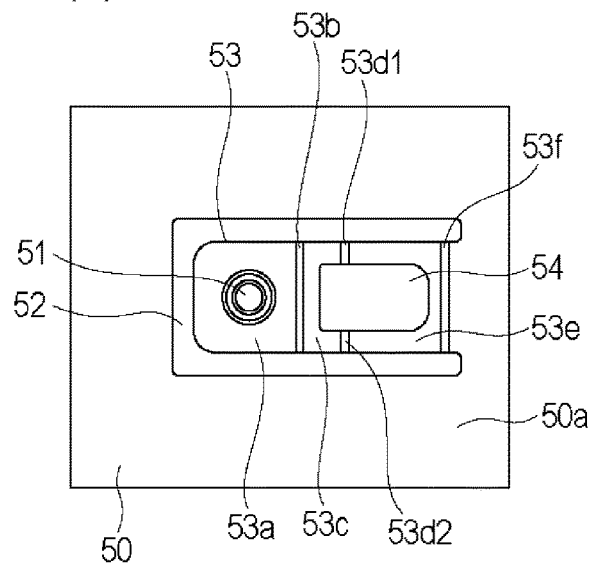
Figure 5:
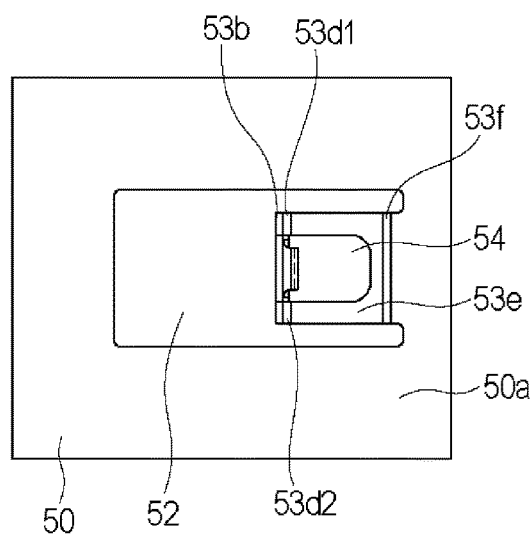
Figure 5:
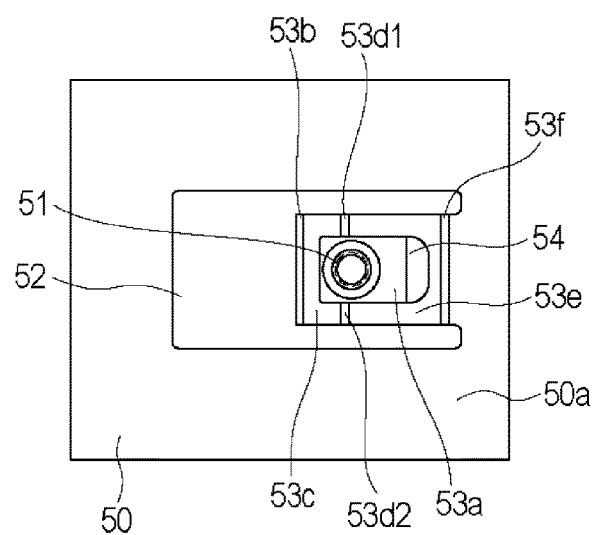
Figure 5:
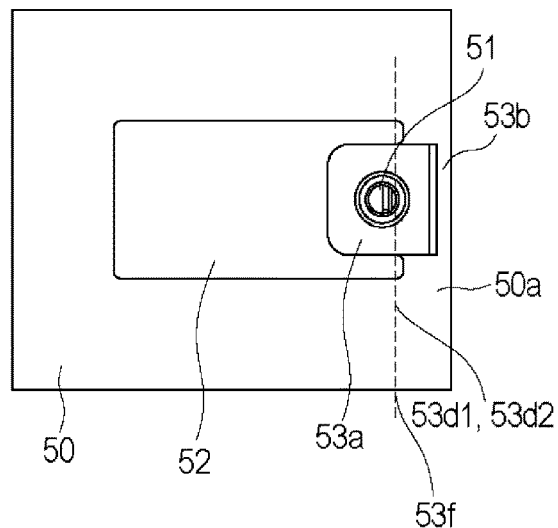

Parts (a) to (d) of FIG. 5 are schematic views for illustrating a processing method of a metal plate member of the assembling structure in First Embodiment.

Figure 6:
Figure 6:
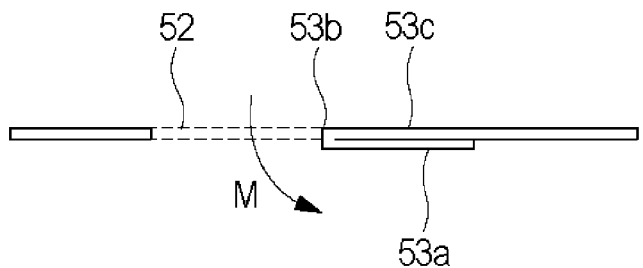
Figure 6:
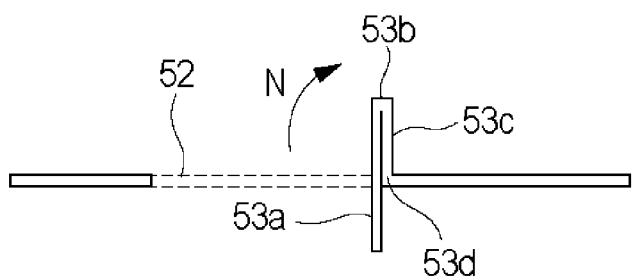
Figure 6:
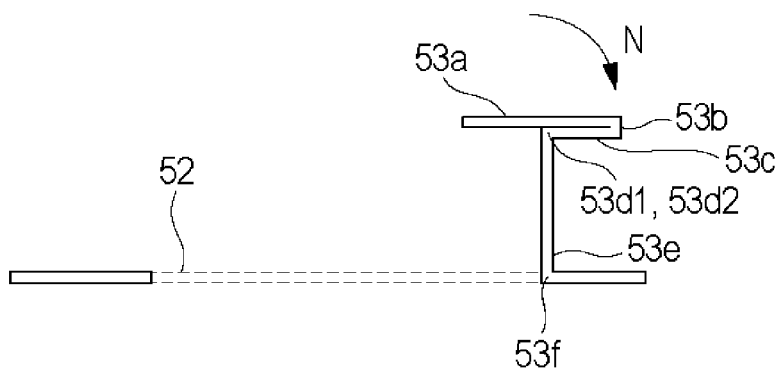

Parts (a) to (d) of FIG. 6 are schematic sectional views for illustrating the processing method of the metal plate member of the assembling structure in First Embodiment.

Figure 7:
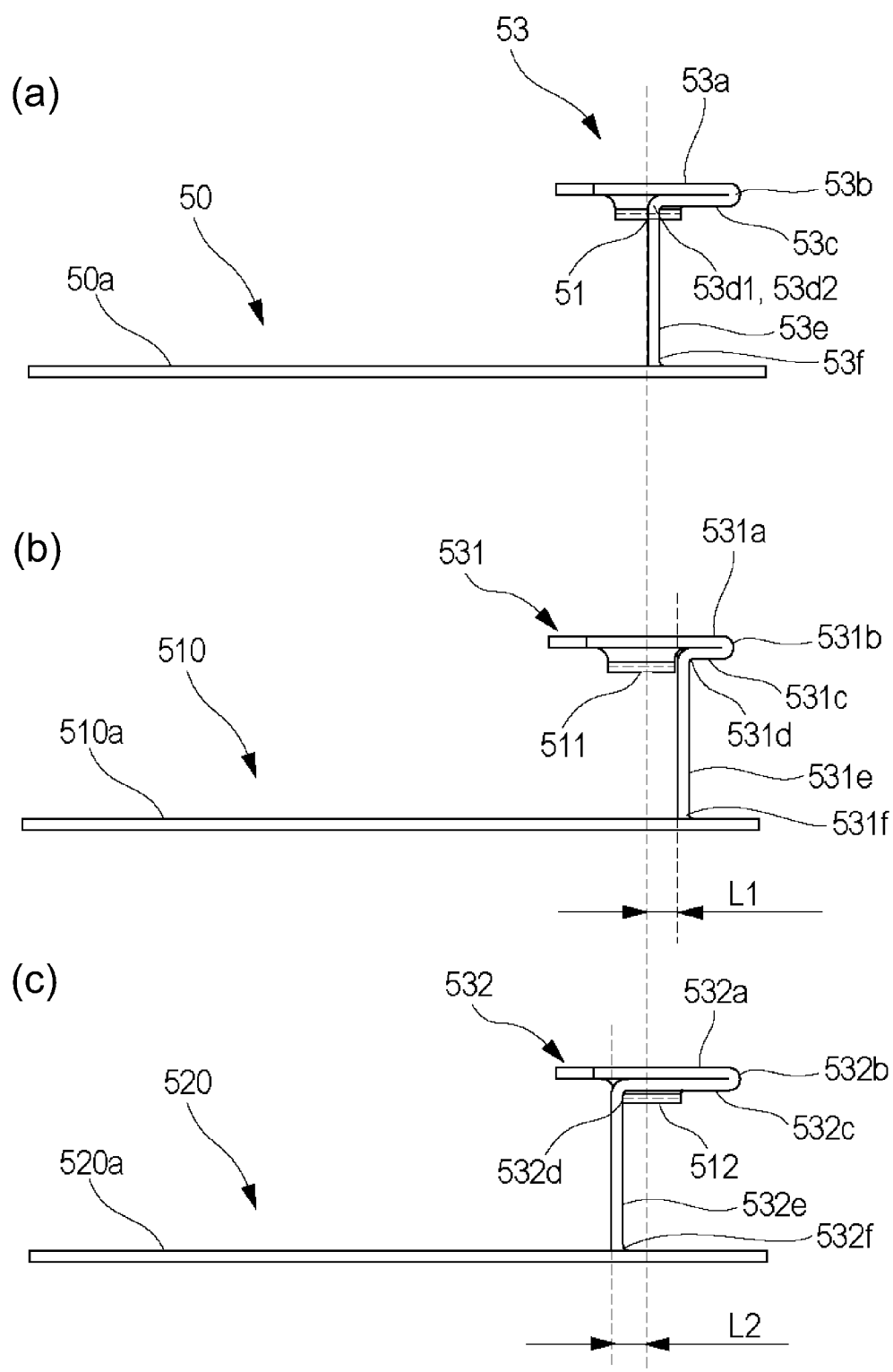

Part (a) of FIG. 7 is a front view showing a standing portion in First Embodiment, and parts (b) and (c) of FIG. 7 are front views each showing a standing portion in a modified example (conventional example).

Figure 8:
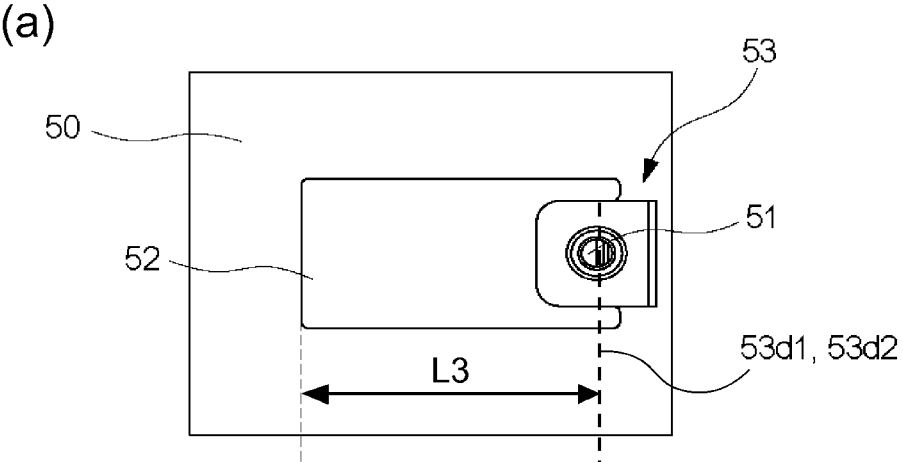
Figure 8:
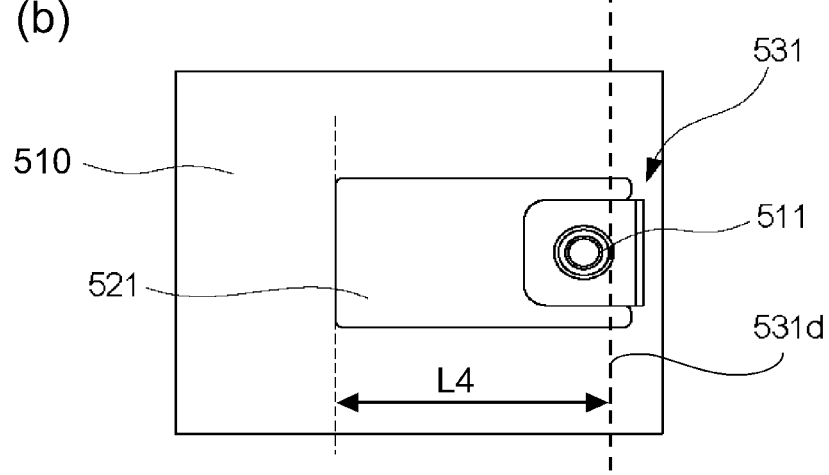
Figure 8:
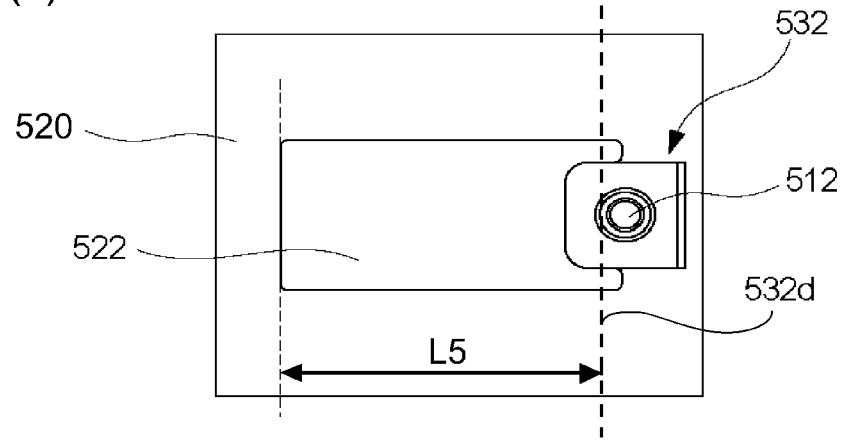

Part (a) of FIG. 8 is a top plan view showing the standing portion in First Embodiment, and parts (b) and (c) of FIG. 8 are top plan views each showing the standing portion in the modified example (conventional example).

Figure 9:
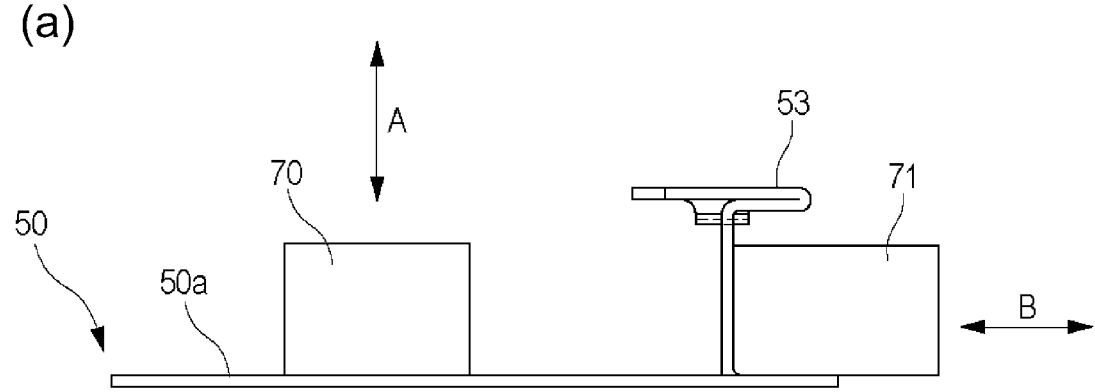
Figure 9:
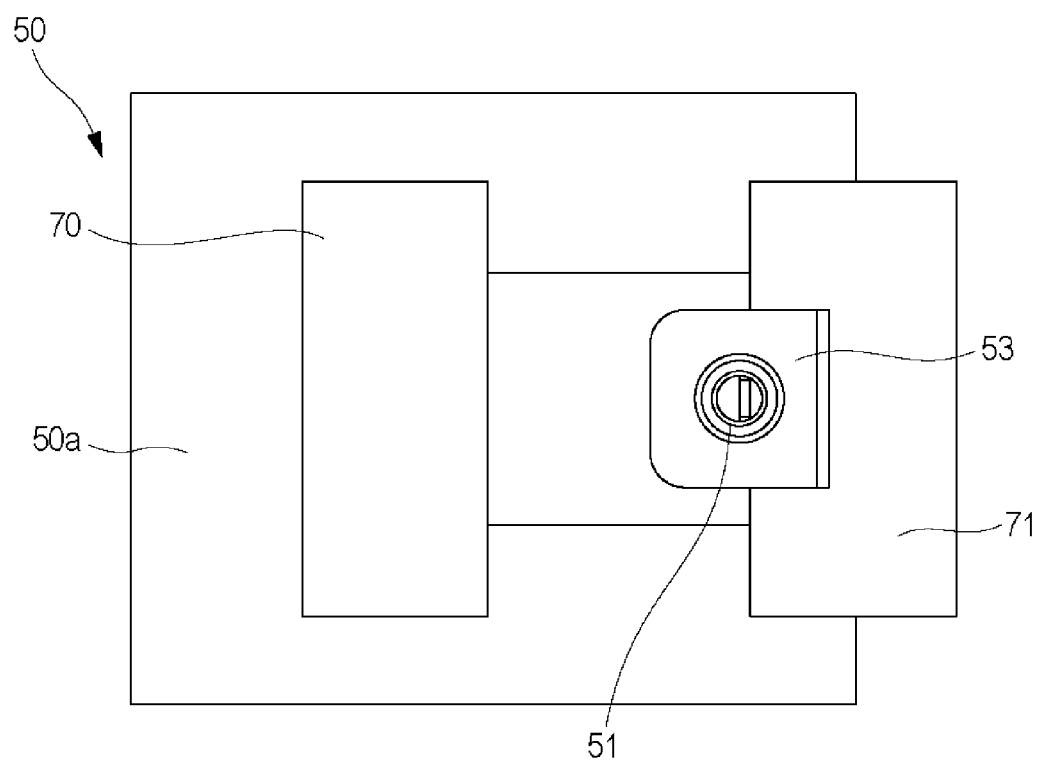

Parts (a) and (b) of FIG. 9 are schematic views for illustrating the processing method of the metal plate member of the assembling structure in First Embodiment.

Figure 10:
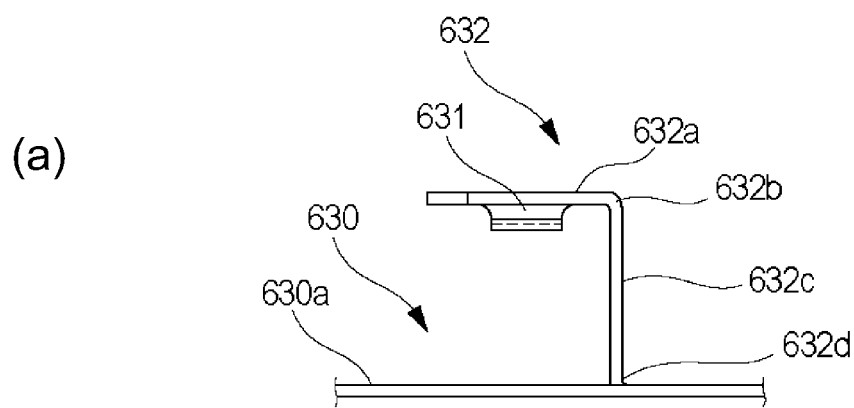
Figure 10:
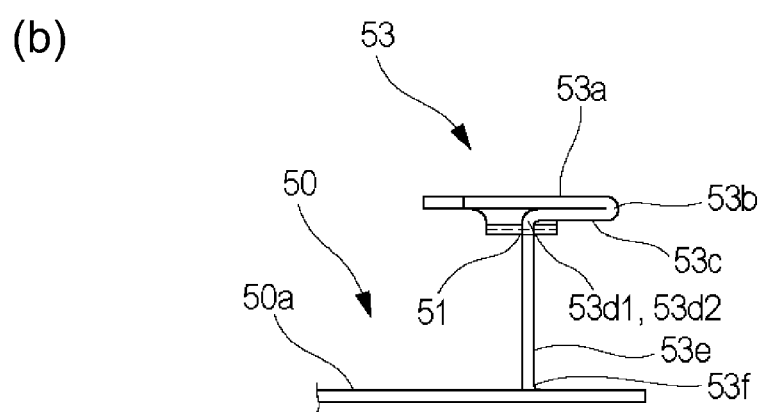
Figure 10:
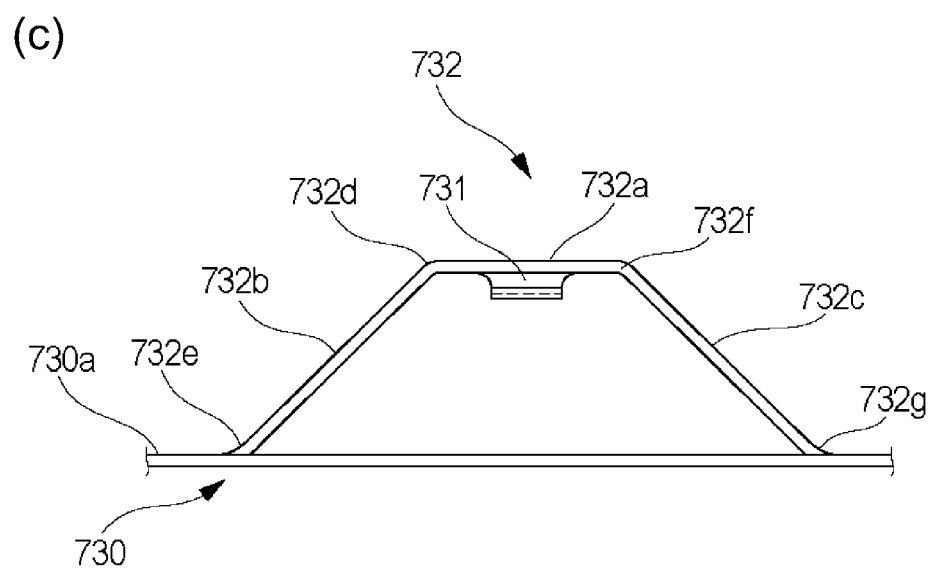

Part (a) of FIG. 10 is a front view showing a standing portion in conventional example 1, part (b) of FIG. 10 is a front view showing a standing portion in First Embodiment, and part (c) of FIG. 10 is a front view showing a standing portion in conventional example 2.

Figure 11:
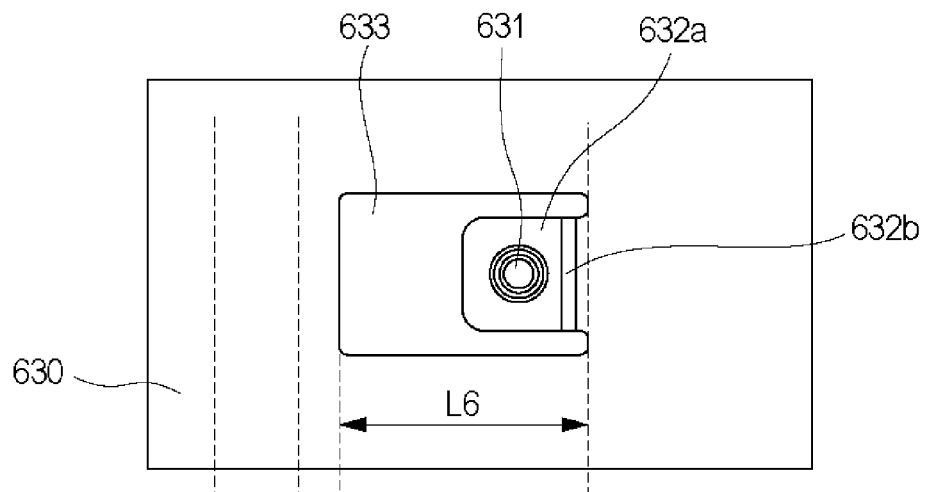
Figure 11:
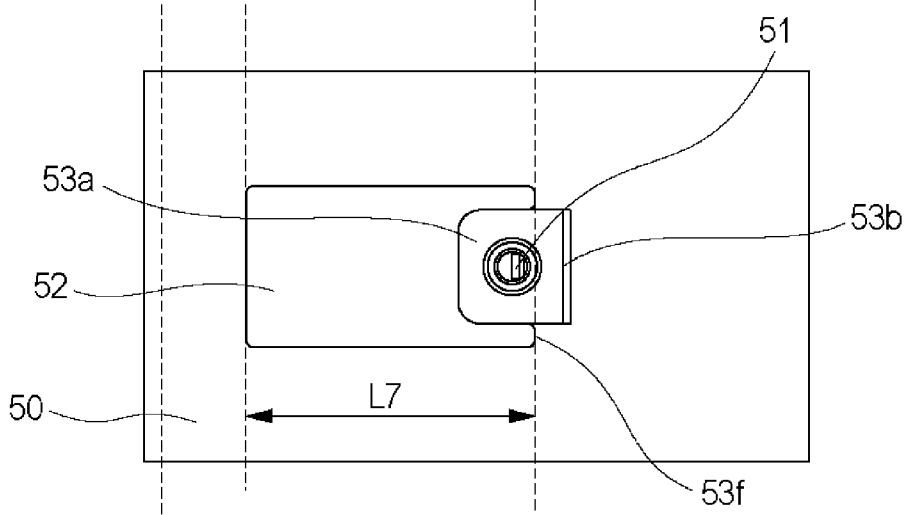
Figure 11:
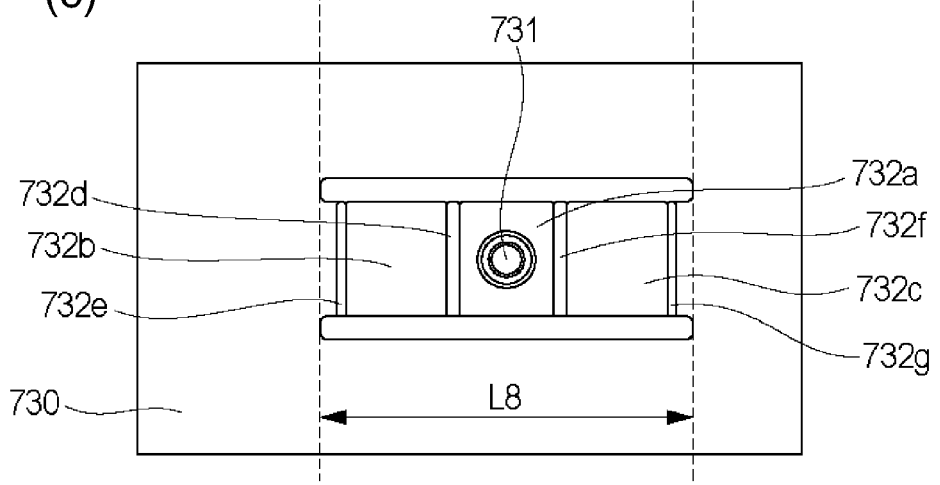

Part (a) of FIG. 11 is a top plan view showing the standing portion in conventional example 1, part (b) of FIG. 11 is a top plan view showing the standing portion in First Embodiment, and part (c) of FIG. 11 is a top plan view showing the standing portion in conventional example 2.

Figure 12:
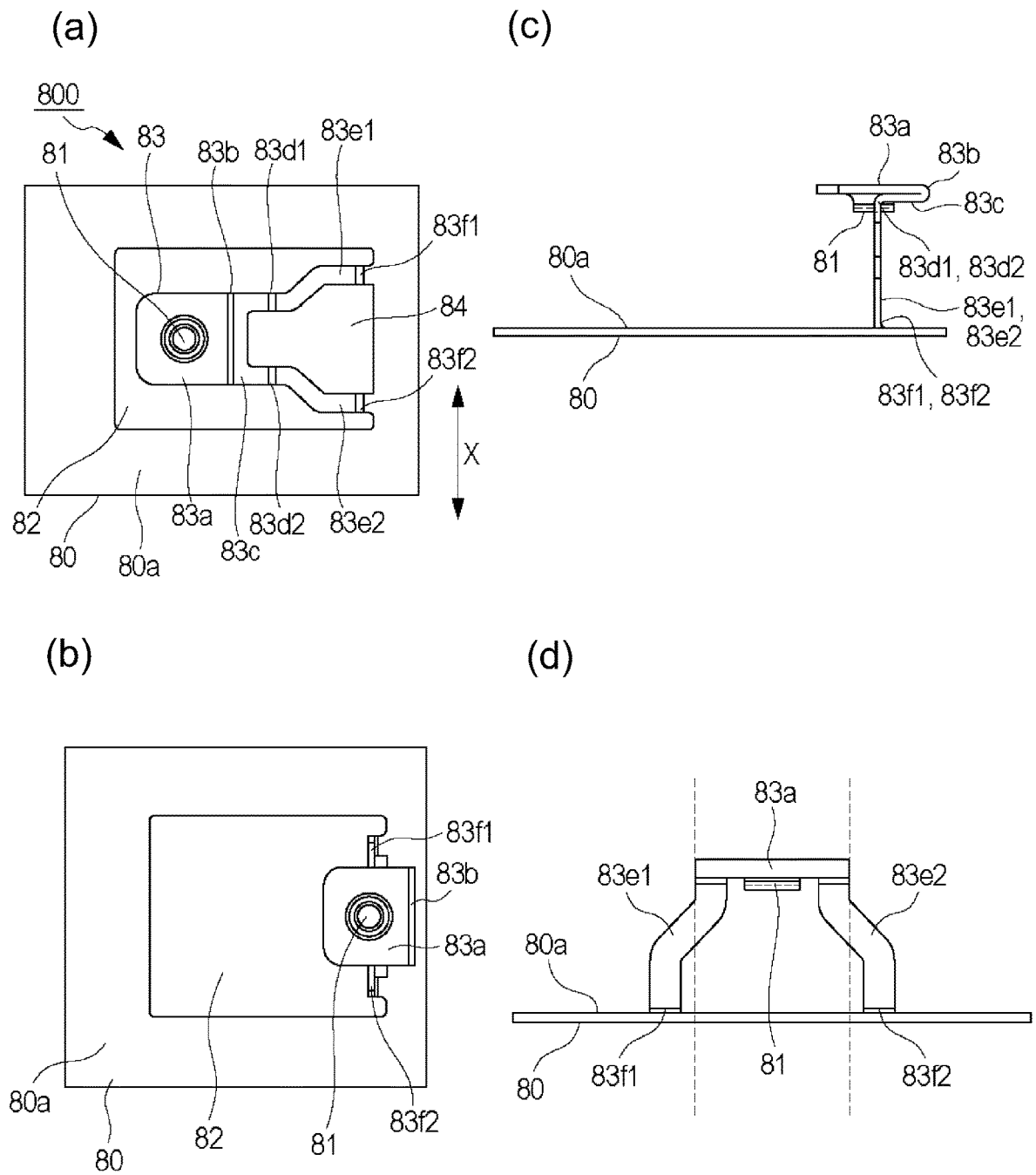

Parts (a) to (d) of FIG. 12 are schematic views for illustrating an assembling structure in Second Embodiment.

Figure 13:
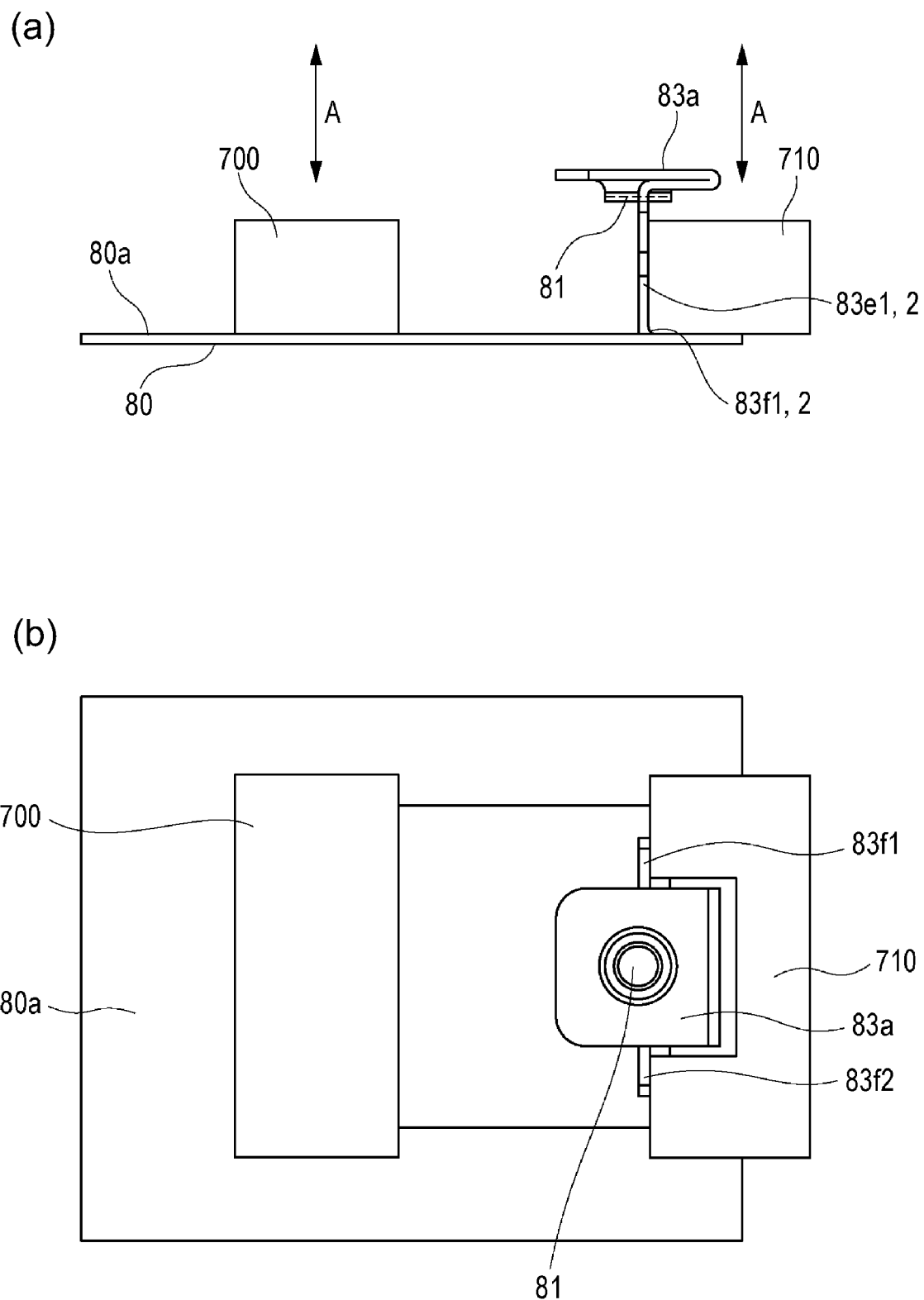

Parts (a) and (b) of FIG. 13 are schematic views for illustrating a processing method of a metal plate member of the assembling structure in Second Embodiment.

DESCRIPTION OF EMBODIMENTS

Embodiments of the present invention will be described in detail with reference to the drawings. Incidentally, the following embodiments do not limit the present invention according to the claims, and all combinations of features described in the embodiments are not necessarily essential to means for solving the problem of the present invention. Incidentally, members common to the respective figures are represented by the same reference numerals or symbols.

First Embodiment (Image Forming Apparatus)

Figure 1:
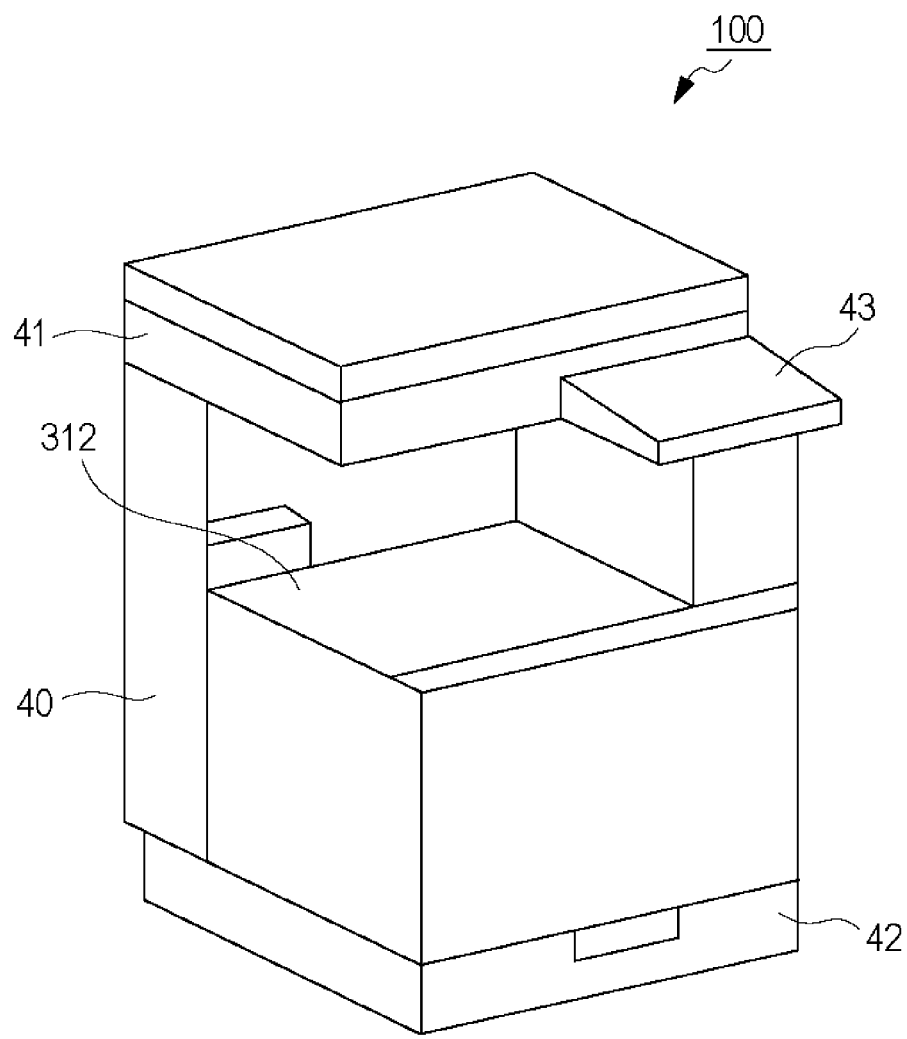
FIG. 1 is a schematic perspective view showing an image forming apparatus.
Figure 2:
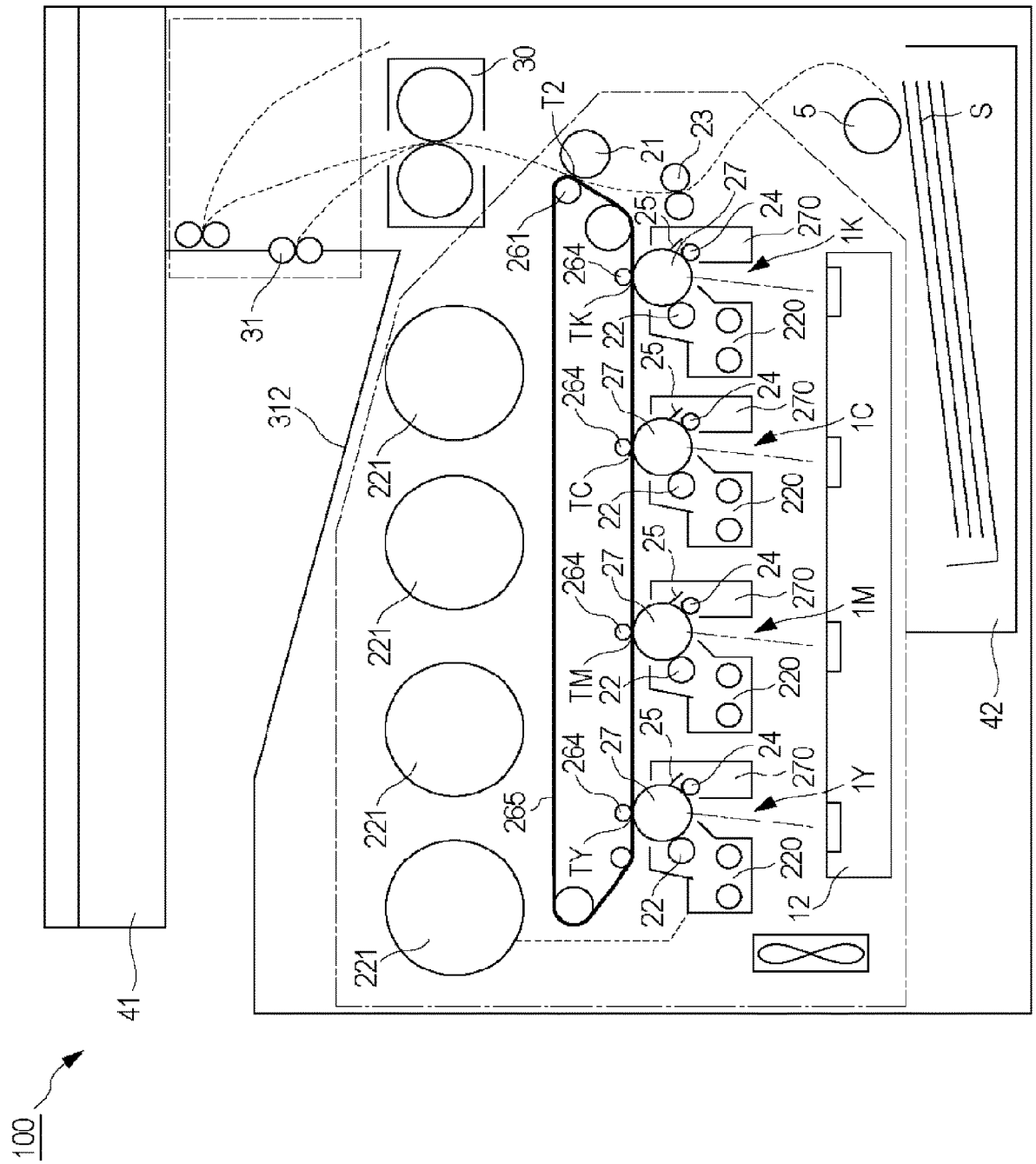
FIG. 2 is a schematic sectional view showing the image forming apparatus.

FIG. 1 is a schematic perspective view of an image forming apparatus 100 in this embodiment. FIG. 2 is a schematic sectional view of the image forming apparatus 100.

As shown in FIG. 1, the image forming apparatus 100 in this embodiment includes an apparatus main assembly 50, an image reading portion 41 provided at an upper portion of the apparatus main assembly 40 and capable of reading an image of an original, a sheet feeding portion 42 for feeding sheets to an image forming portion described later, and an operating portion 43 operable by a user. Further, the apparatus main assembly 40 is provided with a discharge tray 312 for discharging a sheet, on which an image is formed inside the apparatus main assembly 40, to an outside of the apparatus main assembly 40.

As shown in FIG. 2, the image forming apparatus 100 in this embodiment is an intermediary transfer type color printer of a tandem type in which image forming portions 1Y, 1M, 1C and 1K are arranged along a surface of an intermediary transfer belt 265 in the apparatus main assembly 40.

At the image forming portion 1Y, a yellow toner image is formed on a photosensitive drum 27(Y) and then is transferred at a primary transfer portion TY onto the intermediary transfer belt 265 by a transfer roller 264. At the image forming portion 1M, a magenta toner image is formed on a photosensitive drum 27(M) and then is transferred at a primary transfer portion TM onto the intermediary transfer belt 265 by a transfer roller 264. At the image forming portions 1C and 1K, cyan and black toner images are formed on photosensitive drums 27(C) and 27(K), respectively, and then are transferred at primary transfer portions TC and TK onto the intermediary transfer belt 265 by transfer rollers 264. Image forming processes for respective colors are carried out at timings when the toner images are superposed on the upstream-side toner image(s) temporarily transferred on the intermediary transfer belt 265. As a result, on the intermediary transfer belt 265, four-color toner images are formed.

The four color toner images transferred on the intermediary transfer belt 265 are conveyed to a secondary transfer portion T2 and are secondary-transferred onto a recording material S. A separation roller 5 separates sheets of the recording material S, one by one, pulled out from a recording material cassette 4, and then feeds the recording material S to a registration roller pair 23.

The registration roller pair 23 sends the recording material S to the secondary transfer portion T2 while being timed to the toner images on the intermediary transfer belt 265. The recording material S on which the four color toner images are secondary-transferred is pressed and heated by a fixing device 30, so that the toner images are fixed on a surface of the recording material S. Thereafter, the recording material S is discharged on a discharge tray 312 by a discharging roller pair 31.

Four toner cartridges 221 are provided for colors of yellow, magenta, cyan and black, respectively, and each toner cartridge 221 supplies toner to a developing cartridge 220.

The image forming portions 1Y, 1M, 1C and 1K have the substantially same constitution except that colors of toners used in associated developing cartridges 220, respectively, are yellow, magenta, cyan and black, respectively, which are different from each other. In the following, the image forming portion is described as an image forming portion 1, and redundant explanation about the image forming portions 1Y, 1M, 1C and 1K will be omitted.

The image forming portion 1 includes, at a periphery of the photosensitive drum 27, a charging roller 24, an exposure device 12, the developing cartridge 220, a transfer roller 264 and a cleaning blade 25. The photosensitive drum 27 rotates at a predetermined process speed.

The drum cartridge 270 includes the photosensitive drum 27, the charging roller 24 electrically charging a surface of the photosensitive drum 27 to a negative potential uniformly, and the cleaning blade 25 for removing transfer residual toner by sliding with the surface of the photosensitive drum 27.

The exposure device 12 scans the surface of the photosensitive drum 27 with a laser beam, obtained by ON-OFF modulation of a scanning line image signal developed from an associated color image data, through a rotating mirror, so that an electrostatic image for an image is formed on the surface of the photosensitive drum 27.

The developing cartridge 220 develops the electrostatic image into a toner image as a developer image by transferring the toner onto the photosensitive drum 27 by a developing sleeve 22. The transfer roller 264 is supplied with a primary transfer bias and primary-transfers the toner image from the photosensitive drum 27 onto the intermediary transfer belt 265. The cleaning blade 25 removes a transfer residual toner by sliding on the photosensitive drum 27.

On a back surface side of the image forming apparatus 100 shown in FIGS. 1 and 2, a controller unit including a control substrate for controlling the image forming portion 1 and the like is provided. The controller unit is prepared by assembling the control substrate and a cover portion for covering the control substrate or the like portion into a unit.

A structure of the controller unit of the image forming apparatus 100 in this embodiment will be described.

Parts (a) and (b) of FIG. 3 are partially enlarged views of a controller unit 10 in this embodiment. Part (a) of FIG. 3 is a perspective view of the controller unit 10 when a member-to-be-supported 60 which is the cover portion is mounted on and supported by an assembling structure 500, and part (b) of FIG. 3 is a top plan view showing a state in which the member-to-be-supported 60 is mounted on and supported by the assembling structure 500.

As described above, the controller unit 10 includes an unshown control substrate and the like inside thereof and is fixed inside the apparatus main assembly 40 by the assembling structure 500 which is an example of a supporting member. Incidentally, the controller unit 10 is provided inside an outer casing cover positioned on a rear surface side of the apparatus main assembly 40.

The assembling structure 500 is constituted by a metal plate member 50, and the member-to-be-supported 60 which is the cover portion for covering the control substrate is fastened with a screw 62. The member-to-be-supported 60 is supported by the assembling structure 500 by being fastened with the screw 62.

In this embodiment, the screw 62 is inserted into a screw hole 61, provided in the member-to-be-supported 60 which is the cover portion, in an arrow direction indicated by a chain line in part (a) of FIG. 3, and then is fastened to the female thread portion 51 provided in the metal plate member 50 of the assembling structure 500, so that the assembling structure 500 and the member-to-be-supported 60 are fixed to each other. As a result, in the controller unit 10, an unshown electric substrate is covered with the member-to-be-supported 60 which is the cover member. Incidentally, in this embodiment, as an example of the member-to-be-supported 60, the cover member of the electric substrate is cited, but a constitution in which as the member-to-be-supported 60, another member such as the electric substrate, a sensor or a fan is fastened to the assembling structure 500 may also be employed.

As in this embodiment, in the case where the member-to-be-supported 60 is fastened to the assembling structure 500 comprising the metal plate member 50 with the screw 62, it is desired that the metal plate member 50 is not deformed.

This is because when the metal plate member 50 is deformed during fastening of the screw 62, the screw 62 is fastened in a state in which an axis of the screw 62 is inclined with respect to an axis of the female thread portion 51 and thus the female thread portion 51 formed by cutting is broken in some instances. In this case, a fastening force by the screw 62 is weakened and fastening of the member-to-be-supported 60 cannot be carried out with accuracy, and therefore, there was a liability that an assembling property became worse. Here, the axis of the female thread portion 51 refers to an axis of a tap for forming the female thread portion 51 inside the cylindrical portion formed in the metal plate member 50 by burring, and is a center line of a circle of the female thread portion 51.

Further, in recent years, in order to realize weight reduction and resource saving of the apparatus main assembly, a thin metal plate member 50 is used in the apparatus in some instances. In the case of this constitution, there is a tendency that strength of the metal plate member 50 itself is weakened corresponding to a decreased thickness. Accordingly, when the screw 62 is fastened, the metal plate member is deformed easier than the case where a thick metal plate member. For that reason, due to deformation of the metal plate member 50, the screw 62 is fastened to the metal plate member 50 in the state in which the axis of the screw 62 is inclined with respect to the center line of the female thread portion 51, so that the female thread portion 51 is broken in some instances. Also in this case, the fastening force of the member-to-be-supported 60 by the screw 62 is weakened and the fastening of the member-to-be-supported 60 cannot be accurately carried out, and therefore, the assembling structure 500 is required to be exchanged, so that there has a liability that the assembling property became worse.

In this embodiment, a constitution in which even in the case where such a thin metal plate member 50 is used, deformation of the metal plate member 50 is suppressed will be described.

In the following, a processing method of the metal plate member 50 will be described using FIGS. 4 to 6.

FIG. 4 is a partially perspective view showing a part of the assembling structure 500 for suppressing the deformation of the metal plate member 50 and showing the metal plate member 50 after processing.

Parts (a) to (d) of FIG. 5 are top plan views showing the processing method of the metal plate member 50. Part (a) of FIG. 5 is the top plan view showing the metal plate member 50. Part (b) of FIG. 5 is the top plan view showing a state in which the metal plate member 50 is bent at a first bending portion 53b. Part (c) of FIG. 5 is the top plan view showing a state in which the metal plate member 50 is bent at second bending portions 53d1 and 53d2. Part (d) of FIG. 5 is the top plan view showing a state in which the metal plate member 50 is bent at a third bending portion 53f and showing the metal plate member 50 after the processing.

Parts (a) to (d) of FIG. 6 are schematic sectional views showing the processing method of the metal plate member 50. Part (a) of FIG. 6 is the schematic sectional view showing the metal plate member 50 shown in part (a) of FIG. 5. Part (b) of FIG. 6 is the schematic sectional view showing the metal plate member 50 shown in part (b) of FIG. 5. Part (c) of FIG. 6 is the schematic sectional view showing the metal plate member 50 shown in part (c) of FIG. 5. Part (d) of FIG. 6 is the schematic sectional view showing the metal plate member 50 shown in part (d) of FIG. 5. Incidentally, in FIG. 6, in order to make a processing step easy to understand, the female thread portion 51 is omitted.

In this embodiment, the assembling structure 500 is constituted by the metal plate member 50 as described above. In this embodiment, as the metal plate member 50, a 0.6 mm-thick electrogalvanized steel plate is used.

As shown in FIGS. 4 and 5, the metal plate member 50 in this embodiment is provided with a channel-shaped cut-away portion 52 formed so that a portion inside the cut-away portion 52 is processed so as to project as a standing portion (rising portion) 53 from a plate surface 50a. Thus, the standing portion 53 is formed integrally with the single metal plate member 50.

As shown in FIGS. 4 and 5, the standing portion 53 is constituted by a first plate portion 53a, the first bending portion 53b, a second plate portion 53c, the pair of second bending portions 53d1 and 53d2, a third plate portion 53e, the third bending portion 53f and a hole 54.

The standing portion 53 is, as shown in part (a) of FIG. 5, formed so as to project from the plate surface 50a of the metal plate member 50 by subjecting a portion enclosed by the channel-shaped cut-away portion 52 to bending before the processing of the metal plate member 50.

Further, each of the first bending portion 53b, the second bending portions 53d1 and the third bending portion 53f of the standing portion 53 is formed so as to extend in parallel to other portions. Further, each bending portion is subjected to bending with respect to a direction perpendicular to an inserting direction of the screw 62 into the screw hole 61.

The female thread portion 51 of the thus formed standing portion 53 can fix the member-to-be-supported 60 and the assembling structure 500 by fastening the screw 62 inserted into the screw hole 61 of the member-to-be-supported 60. Further, the member-to-be-supported 60 can be supported by the assembling structure 500.

Incidentally, in this embodiment, as the screw 62, a small collar head screw is used, and the screw 62 is constituted by a head portion 62a and a normal portion 62b which is a portion ranging from the head portion 62a to a free end of the screw 62 on a downstream side of the inserting direction of the screw 62. In this embodiment, a portion downstream of the head portion 62a with respect to the inserting direction of the screw 62 and smaller in diameter than a collar portion on the downstream side of the screw inserting direction to the free end of the screw 62 on a further downstream side of the screw inserting direction is referred to as the normal portion 62b, and the normal portion 62b is provided with screw threads capable of fastening to the female thread portion 51.

Further, the normal portion 62b of the screw 62 in this embodiment is M3 in nominal diameter and 6 mm in normal length.

Further, as shown in FIG. 4 and part (a) of FIG. 5, in the first plate portion 53a of the standing portion 53, the female thread portion 51 formed by subjecting the metal plate member 50 to the burring and then by subjecting an inner periphery of a burred portion to cutting is provided. Here, a hole (bored portion) formed by subjecting the metal plate member 50 to the burring is an example of a first hole. That is, the female thread portion 51 is formed by subjecting the inner periphery of the hole, formed by the burring, to the cutting.

In order to form the standing portion 53 as shown in FIG. 4, the first bending portion 53b is bent in an arrow M direction shown in part (b) of FIG. 6, so that the metal plate member 50 is bent from the state shown in part (a) of FIG. 5 and part (a) of FIG. 6 to the state shown in part (b) of FIG. 5 and part (b) of FIG. 6.

At the first bending portion 53b, so-called hemming such that the first plate portion 53a is bent 180° with respect to the second plate portion 53c so that the second plate portion 53c and the first plate portion 53a superposedly contact each other is performed. In this embodiment, the hemming is carried out so that one surface of the second plate portion 53c contacts a surface of the first plate portion 53a opposite from a surface of the first plate portion 53a contactable to the member-to-be-supported 60. At this time, in consideration of an error due to processing accuracy, a constitution in which a part of the second plate portion 53c contacts the first plate portion 53a even when an entire surface of the second plate portion 53c does not contact the first plate portion 53a may only be required to be employed. Here, the plate surface 50a of the metal plate member 50 is an example of a first surface, and a surface opposite from the plate surface 50a is an example of a second surface.

In the state in which the first bending portion 53b is subjected to the hemming, the female thread portion 51 is positioned inside the hole 54.

Further, the pair of second bending portions 53d1 and 53d2 to be bent in a subsequent step is provided on a rectilinear line so as to sandwich the hole 54. In the state of part (b) of FIG. 5, the pair of second bending portions 53d1 and 53d2 is provided outside the hole 54 on the rectilinear line so as to sandwich the female thread portion 51.

In this embodiment, as shown in part (b) of FIG. 5, the second bending portions 53d1 and 53d2 are provided linearly so as to extend across a center position of the female thread portion 51. That is, the second bending portions 53d1 and 53d2 are provided at positions parallel to a direction which is perpendicular to the screw inserting direction of the female thread portion 51 and in which the first bending portion 53b extends.

Next, the pair of second bending portions 53d1 and 53d2 is bent in an arrow N direction shown in part (c) of FIG. 6 and thus is bent from the state shown in part (b) of FIG. 5 and part (b) of FIG. 6 to the state shown in part (c) of FIG. 5 and part (c) of FIG. 6. Here, the pair of second bending portions 53d1 and 53d2 are processed so that the first plate portion 53a and second plate portion 53c are bent 90° with respect to the plate surface 50a.

Further, the pair of second bending portions 53d1 and 53d2 is provided on the rectilinear line so as to sandwich the female thread portion 51 as shown in part (b) of FIG. 5, and therefore, contacts the first plate portion 53a at two positions on the rectilinear line with respect to a radial direction of the female thread portion 51 in the bent state.

Next, the third bending portion 53f is bent in the arrow N direction as shown in part (d) of FIG. 6 and thus is bent from the state shown in part (c) of FIG. 5 and part (c) of FIG. 6 to the state shown in part (d) of FIG. 5 and part (d) of FIG. 6. Incidentally, in part (d) of FIG. 5, a bending position by the second bending portions 53d1 and 53d2 and the third bending portion 53f is shown by a broken line.

At this time, the third bending portion 53f is processed so as to bend the third plate portion 53e with respect to the plate surface 50a. The third bending portion 53f is processed so that the third plate portion 53e is bent 90° from the plate surface 50a.

Thus, by processing the metal plate member 50 in the order from parts (a) of FIGS. 5 and 6 to parts (d) of FIGS. 5 and 6, the standing portion 53 is formed on the metal plate member 50 as shown in FIG. 4. Here, the standing portion 53 is formed, as shown in FIG. 4 and part (d) of FIG. 6, by being raised from the plate surface 50a so that a T-shape in cross-section is formed.

Here, at the standing portion 53 after the processing, as shown in FIG. 4, the extending direction of the first plate portion 53a is a direction which is perpendicular to an extending direction of a flat surface of the third plate portion 53e and which is parallel to an extending direction of a flat surface of the first plate portion 53a and is also a direction parallel to an extending direction of a flat surface of the plate surface 50a.

Further, the extending direction of the flat surface of the second plate portion 53c is a direction which is perpendicular to the extending direction of the flat surface of the third plate portion 53e and which is parallel to the extending direction of the flat surface of the first plate portion 53a and parallel to the extending direction of the flat surface of the plate surface 50a.

Further, the extending direction of the flat surface of the third plate portion 53e is a direction which is perpendicular to the extending direction of the flat surface of the plate surface 50a and which is also perpendicular to the extending directions of the flat surfaces of the first plate portion 53a and the second plate portion 53c.

Further, the standing portion 53 is, as shown in part (a) of FIG. 5, provided with an elongated hole 54 is formed so as to be enclosed by the second plate portion 53c and the third plate portion 53e. Here, the hole 54 in an example of a second hole. The hole 54 is, as shown in part (b) of FIG. 5, formed so that the female thread portion 51 does not overlap with the second plate portion 53c and the third plate portion 53e in a state in which the first bending portion 53b is subjected to the hemming. That is, a diameter of the hole 54 is larger than a diameter of the hole formed by the burring when the female thread portion 51 is formed.

By employing this constitution, even in the case where the first bending portion 53b is subjected to the hemming so that the first plate portion 53a and the second plate portion 53c superposedly contact each other, the normal portion 62b of the screw 62 can be prevented from contacting the second plate portion 53e and the third plate portion 53e.

Further, by forming the hole 54 so as to be enclosed by the second plate portion 53c and the third plate portion 53e, the pair of second bending portions 53d1 and 53d2 is linearly formed so as to sandwich the female thread portion 51. That is, a rectilinear line connecting the pair of second bending portions 53d1 and 53d2 is provided at an overlapping position with the female thread portion 51 with respect to the inserting direction of the screw 62. By employing this constitution, the second bending portions 53d1 and 53d2 contact the first plate portion 53a at two points (portions), with respect to a direction crossing the inserting direction of the screw 62, so as to sandwich the female thread portion 51.

Further, at the standing portion 53 after the processing, as shown in FIG. 4, the second bending portions 53d1 and 53d2 and the third bending portion 53f are provided at the same position with respect to a thickness direction of the first plate portion 53a. That is, the second bending portions 53d1 and 53d2 and the third bending portion 53f are provided with respect to the same direction as the inserting direction of the screw 62.

Accordingly, as shown in FIG. 4 and part (d) of FIG. 5, the female thread portion 51 is provided at an overlapping position with the third plate portion 53e with respect to the inserting direction of the screw 62. Further, the second bending portions 53d1 and 53d2 are provided at positions so that the rectilinear line connecting the second bending portions 53d1 and 53d2 pass through the center of the female thread portion 51 with respect to the radial direction of the female thread portion 51. That is, the second bending portions 53d1 and 53d2 are provided at the same position as the center of the female thread portion 51 with respect to a plate thickness direction of the third plate portion 53e. Further, an extending direction of a bending line of the third bending portion 53f is also provided at a position passing through the center of the female thread portion 51 with respect to the radial direction of the female thread portion 51.

By employing this constitution, when the screw 62 is fastened, the first plate portion 53a provided with the female thread portion 51 is supported by the third plate portion 53e through the second bending portions 53d1 and 53d2 and the third bending portion 53f.

That is, a portion, of the first plate portion 53a, outside the female thread portion 51 contacts the second bending portions 53d1 and 53d2, whereby the first plate portion 53a is supported by the third plate portion 53e.

As a result, when the screw 62 is fastened to the female thread portion 51, the female thread portion 51 can be supported with respect to the screw inserting direction in which a force by fastening with the screw is exerted on the metal plate member 50, so that the metal plate member 50 can be prevented from being flexed and deformed during the fastening thereof with the screw 62.

Further, in this embodiment, an inner diameter of the female thread portion 51 is 2.6 mm, and an outer diameter of a portion, of the female thread portion 51, projecting from a surface opposite from the plate surface 50a of the first plate portion 53a of the female thread portion 51 is 3.6 mm.

This is the sum of the diameter of the female thread portion 51 and the thickness of the metal plate member 50 after the burring.

Further, a length (of the first plate portion 53a) from the free end of the standing portion 53 to the first bending portion 53b is 12.1 mm, a length (of the second plate portion 53c) from the first bending portion 53b to the second bending portions 53d1 and 53d2 is 7.4 mm, and a length (of the third plate portion 53e) from the second bending portions 53d1 and 53d2 to the third bending portion 53f is 10.5 mm. Further, at the standing portion 53 after the processing, a length of the hole 54 from a back surface of the first plate portion 53a with respect to a longitudinal direction of the hole 54 which is a direction perpendicular to the extending direction of the flat surface of the first plate portion 53a is 7.4 mm. Further, with respect to the radial direction of the female thread portion 51, a length of the hole 54 with respect to a widthwise direction parallel to the first bending portion 53b is 6.0 mm. That is, a size of the hole 54 is set so as not to interfere with the screw 62 threadably engaged with the female thread portion 51.

Accordingly, when the screw 62 is fastened to the female thread portion 51 of the standing portion 53, the normal portion 62b of the screw 62 does not contact the third plate portion 53e with respect to the screw inserting direction, so that the screw 62 can be stably fastened to the female thread portion 51.

This is because the length of the normal portion 62b of the screw 62 is 6 mm, while the length of the hole 54 from the back surface of the first plate portion 53a at the standing portion 53 after the processing is 7.4 mm. Further, this is also because the inner diameter of the female thread portion 51 is 2.6 mm and the outer diameter of the portion projecting from the surface opposite from the plate surface 50a is 3.6 mm, while the length of the hole 54 with respect to the direction parallel to the first bending portion 53b is 6 mm.

Further, when the screw 62 is fastened to the female thread portion 51 of the standing portion 53, the normal portion 62b of the screw 62 does not contact the second plate portion 53c with respect to the inserting direction, so that the screw 62 can be stably fastened to the female thread portion 51. This is because the nominal diameter of the screw 62 is M3, and with respect to the radial direction of the female thread portion 51, the length of the hole 54 extending in a direction parallel to the first bending portion 53b is 6 mm.

Thus, the hole 54 is formed so that the lengths thereof with respect to the radial direction and the screw inserting direction are made longer than those of the female thread portion 631 and the screw 62. As a result, the fastening of the screw 62 can be stably carried out while supporting the first plate portion 53a in which the female thread portion 51 is formed.

In this embodiment, the respective constituent elements were caused to have the above-described lengths, but the length of the hole 54 from the back surface of the first plate portion 53a may preferably be constituted so as to be at least a value obtained by subtracting a thickness of a member, fixed by the screw 62, such as the member-to-be-supported 60 from the length of the normal portion 62b.

Further, in this embodiment, the constitution in which the female thread portion 51 is formed by cutting the inner periphery of the burring portion was employed, but a constitution in which a tapping screw is used as the screw 62 and in which the female thread portion 51 is formed by forming a groove on an inner peripheral surface of the burring portion simultaneously with the fastening of the screw 62 may also be employed.

Further, in the above-described constitution, the standing portion 53 was formed by cutting away the metal plate member 50, but a constitution in which the standing portion 53 is formed by subjecting the metal plate member 50 to bending from an end portion of the metal plate member 50 without cutting away the metal plate member 50 may also be employed. In the case of this constitution, the plate surface 50a is not needed, and therefore, the standing portion 53 can be formed in a smaller space. Incidentally, even in this constitution, the first bending portion 53*b* and the second bending portions 53*d*1 and 53*d*2 are formed as described above, so that when the screw 62 is fastened to the female thread portion 51, the female thread portion 51 can be supported by the third plate portion 53*e* extending perpendicularly to the first plate portion 53*a*. Accordingly, when the screw 62 is fastened to the female thread portion 51, the female thread portion 51 can be supported by the third plate portion 53*e*, so that the metal plate member 50 is suppressed from being flexed and deformed during the fastening of the screw.

Further, in the above-described constitution, a constitution in which the metal plate member 50 is bent at the second bending portions 53*d*1 and 53*d*2 so that the second plate portion 53*c* and the third plate portion 53*e* provide an angle of 90° therebetween was employed, but a tolerance due to the bending is taken into consideration and a difference of ±1° may also be allowed with respect to 90°. For example, a constitution of substantially 90° such as not less than 89° and not more than 91° may also be employed.

Accordingly, the term "right angle" in the claims refers to an angle of not less than 89° and not more than 91°.

Further, a constitution in which the metal plate member 50 is bent at the third bending portion 53*f* so that the third plate portion 53*e* and the plate surface 50*a* provide an angle of 90° therebetween was employed, but a tolerance due to the bending is taken into consideration and a constitution of substantially 90° such as not less than 89° and not more than 91° may also be employed.

Also in this constitution, when with respect to the radial direction of the female thread portion 51, a third plate portion 53*e* supports the first plate portion 53*a* at two positions sandwiching the female thread portion 51 therebetween, it is possible to suppress breakage of the female thread portion 51 caused due to deformation of the metal plate member 50 flexed during the fastening of the screw 62.

Next, with reference to FIGS. 7 and 8, strength of the standing portion 53 of the metal plate member 50 when a force is exerted on the standing portion 53 during the fastening of the screw 62 will be described using modified examples (comparison examples).

Parts (a) to (c) of FIG. 7 are front views each showing a standing portion. Part (a) of FIG. 7 is the front view showing the standing portion 53 in this embodiment (First Embodiment). Part (b) of FIG. 7 is the front view showing a standing portion 531 in a modified example (comparison example) in which positions of second bending portions 531*d*1 and 531*d*2 are different from the positions of the second bending portions 53*d*1 and 53*d*2. Part (c) of FIG. 7 is the front view showing a standing portion 532 in a modified example (comparison example) in which positions of second bending portions 532*d*1 and 532*d*2 are different from the positions of the second bending portions 53*d*1 and 53*d*2.

Parts (a) to (c) of FIG. 8 are top plan views each showing a standing portion. Part (a) of FIG. 8 is the top plan view showing the standing portion 53 of part (a) of FIG. 7 in this embodiment (First Embodiment). Part (b) of FIG. 7 is the top plan view showing a metal plate member 510 including a standing portion 531 of part (b) of FIG. 7 in the modified example (comparison example). Part (c) of FIG. 7 is the top plan view showing a metal plate member 520 including a standing portion 532 of part (c) of FIG. 7 in the modified example (comparison example).

The standing portion 53 in this embodiment has the above-described constitution, and as shown in part (a) of FIG. 7 and part (a) of FIG. 8, a rectilinear line connecting the second bending portions 53*d*1 is formed at a position passing through a center of the female thread portion 51 with respect to the radial direction of the female thread portion 51. Accordingly, at positions passing through a substantially center of the female thread portion 51, bending lines of the second bending portions 53*d*1 and 53*d*2 and the third bending portion 53*f* are formed. Further, with respect to the inserting direction of the screw 62, the third plate portion 53 is positioned within a projection plane of the female thread portion 51 by forming the second bending portions 53*d*1 and 53*d*2 and the third bending portion 53*f* in the projection plane. Accordingly, the bending lines of the second bending portions 53*d*1 and 53*d*2 and the third bending portion 53*f* are formed at the same positions as the center of the female thread portion 51.

Further, the standing portion 53 in this embodiment is formed as a part of the metal plate member 50 so as to have a T-shape in a state in which the metal plate member 50 is seen from a front surface side as shown in part (a) of FIG. 7.

In the modified example shown in part (b) of FIG. 7 and part (b) of FIG. 8, a second bending portion 531*d* is formed in a direction of approaching a first bending portion 531*b* compared with a female thread portion 511. Accordingly, in a constitution shown in part (b) of FIG. 7, compared with a constitution shown in part (a) of FIG. 7, the second bending portion 531*d* is formed at a position closer to the first bending portion 531*b* on a right side of part (b) of FIG. 7 by a length L1 with respect to a center line of the female thread portion 511 than the female thread portion 511 is.

In the modified example shown in part (c) of FIG. 7 and part (c) of FIG. 8, a second bending portion 531*d* is formed in a direction of being spaced from a first bending portion 532*b* compared with a female thread portion 512 and is formed on a free end side of a first plate portion 532*a*. Accordingly, in a constitution shown in part (c) of FIG. 7, compared with a constitution shown in part (a) of FIG. 7, the second bending portion 532*d* is formed at a position remoter from the first bending portion 532*b* on a left side of part (c) of FIG. 7 by a length L2 with respect to a center line of the female thread portion 512 than the female thread portion 512 is.

In the respective structures shown in parts (a) to (c) of FIGS. 7 and 8, in the case where the same force is exerted on the female thread portion 51 (511 or 512), strength against the force received by the metal plate member 50 (510 or 520) is strongest in the case of part (a) of FIG. 7 (this embodiment) and is second-strongest in the case of part (c) of FIG. 7. In the case of part (b) of FIG. 7, the strength is weakest among the three structures shown in parts (a) to (c) of FIG. 7. Accordingly, the strength when the screw is fastened to the female thread portion is strongest in the case of part (a) of FIG. 7, is second-strongest in the case of part (c) of FIG. 7, and is weakest in the case of part (b) of FIG. 7.

This is influenced by a positional relationship between the first plate portion 53*a* (531*a*, 532*a*) including the female thread portion 51 (511, 512) formed at a force-exerted position with other portions comprising the second bending portions 53*d*1 and 53*d*2 (531*d*, 532*d*), the third bending portion 53*f* (531*f*, 532*f*) and the third plate portion 53*e* (531*e*, 532*e*) supporting the female thread portion 51 (511, 512).

In the constitutions shown in parts (b) of FIGS. 7 and 8, the first plate portion 531*a* in which the female thread portion 511 is formed is supported by the third plate portion 531*e* at a position shifted from the center (line) of the female thread portion 511 by the length L1. Accordingly, in the case where the force is exerted on the female thread portion 511, in the second bending portion 531*d* and the third plate portion 531*e*, a force by which the first plate portion 531*a* in which the female thread portion 511 is formed is deformed so as to approach a plate surface 510*a* and a force by which a free end portion of the first plate portion 531*a* is deformed so as to approach the third plate portion 531*e* are liable to generate.

Further, compared with the constitution of parts (b) of FIGS. 7 and 8, in the constitution of parts (c) of FIGS. 7 and 8, an area in which the first plate portion 532*a* overlaps with a second plate portion 532*c* is large. Accordingly, the strength of the first plate portion 532*a* is stronger than the strength of the first plate portion 531*a* correspondingly to the area in which the first plate portion 532*a* overlaps with the second plate portion 532*c*.

However, in the constitutions shown in parts (c) of FIGS. 7 and 8, the first plate portion 532*a* in which the female thread portion 512 is formed is supported by the third plate portion 532*e* at a position shifted from the center (line) of the female thread portion 512 by the length L2. Accordingly, in the case where the force is exerted on the female thread portion 512, in the second bending portion 532*d* and the third plate portion 532*e*, a force by which the first plate portion 532*a* in which the female thread portion 512 is formed is deformed so as to approach a plate surface 520*a* and a force by which the first bending plate 532*b* is deformed so as to approach the third plate portion 532*e* are liable to generate.

On the other hand, in the constitution of this embodiment shown in parts (a) of FIGS. 7 and 8, the first plate portion 53*a* in which the female thread portion 51 is formed is supported by the second bending portions 53*d*1 and 53*d*2 and the third plate portion 53*e* at the substantially same position as the center line of the female thread portion 51. Accordingly, in the case where a force is exerted on the female thread portion 51 in the screw inserting direction, compared with the constitutions of parts (b) of FIGS. 7 and 8 are parts (c) of FIGS. 7 and 8, the first plate portion 53*a* is not readily flexed.

From the above, the structure of the standing portion 53 of the metal plate member 50 in this embodiment is capable of having the strength stronger than those in the respective comparison examples (modified examples) shown in parts (b) and (c) of FIGS. 7 and 8.

Incidentally, in the case where the standing portion 53 is formed by cutting away the metal plate member 50 as shown in part (a) of FIG. 8 in this embodiment, a longitudinal dimension of a necessary cut-away portion 52 is L3.

On the other hand, in the case where the standing portion 531 is formed by cutting away the metal plate member 511 as shown in part (b) of FIG. 8 in the comparison example, a longitudinal dimension of a necessary cut-away portion 521 is L4.

Further, in the case where the standing portion 532 is formed by cutting away the metal plate member 512 as shown in part (c) of FIG. 8 in the comparison example, a longitudinal dimension of a necessary cut-away portion 522 is L5.

Here, a relationship among L3, L4 and L5 is L4<L3<L5. This is because in the comparison example shown in part (b) of FIG. 8, the second plate portion 531*c* is formed in a length shorter than those in the structure of part (a) of FIG. 8 in this embodiment and the structure of part (c) of FIG. 8 in another comparison example.

Accordingly, the dimension of the metal plate member in the case where the standing portion is formed can be minimized in the structure shown in part (b) of FIG. 8.

However, in the structure of part (b) of FIG. 8, the strength of the standing portion is weakest among those in the above-described three structures. For that reason, in the structures using a thin metal plate member, the structure of part (a) of FIG. 8 in this embodiment and the structure of part (c) of FIG. 8 in another comparison example are superior to the structure of part (b) of FIG. 8 in the comparison example.

Incidentally, in the structure of part (a) of FIG. 8 in this embodiment, compared with the structure of part (c) of FIG. 8 in another comparison example, the dimension (size) of the metal plate member 50 forming the standing portion 53 can be made small and the strength of the first plate portion 53*a* in which the female thread portion 51 is formed can be enhanced. Accordingly, the structure of part (a) of FIG. 8 in this embodiment can be constituted so that the dimension of the metal plate member 50 forming the standing portion 53 can be made small while enhancing the strength of the standing portion 53 in a largest degree among the above-described three structures.

In the above-described embodiment (First Embodiment), a constitution in which the center of the female thread portion 51 with respect to the inserting direction of the screw 62 and the rectilinear line connecting the second bending portions 53*d*1 and 53*d*2 overlap with each other was employed, but the present invention is not limited thereto.

For example, a constitution in which the female thread portion 51 and the second bending portions 53*d*1 and 53*d*2 are formed so that the projection plane of the female thread portion 51 and the rectilinear line connecting the second bending portions 53*d*1 and 53*d*2 overlap with each other may only be required to be employed.

Also by this constitution, the strength of the standing portion 53 in which the female thread portion 51 is provided is stronger than those in the structures of parts (b) and (c) of FIGS. 7 and 8 in the comparison examples.

Incidentally, the structure of the above-described embodiment (First Embodiment) of the structures in which the projection plane of the female thread portion 51 with respect to the inserting direction of the screw 62 and the rectilinear line connecting the second bending portions 53*d*1 and 53*d*2 overlap with each other can enhance the strength of the standing portion 53 most effectively. That is, the constitution in which the center line of the female thread portion 51 and the rectilinear line connecting the second bending portions 53*d*1 and 53*d*2 overlap with each other is capable of most effectively enhancing the strength of the standing portion 53 of the metal plate member 50.

This is because both end sides of the female thread portion 51 with respect to the center line can be supported by the third plate portion 53*e* by forming the second bending portions 53*d*1 and 53*d*2 and the third bending portion 53*f* at the same positions as the center line of the female thread portion 51. As a result, the portion on which the force is most exerted when the screw 62 is fastened to the female thread portion 51 can be supported by the third plate portion 53*e*, and therefore, the first plate portion 53*a* in which the female thread portion 51 is provided is not readily flexed and deformed.

Next, a processing method of the metal plate member 50 in this embodiment will be described using parts (a) and (b) of FIG. 9.

Parts (a) and (b) of FIG. 9 are schematic views for illustrating the processing method of the metal plate member 50 in this embodiment, in which part (a) of FIG. 9 is a front view of the metal plate member 50 after processing, and part (b) of FIG. 9 is a top plan view of the metal plate member 50 shown in part (a) of FIG. 9.

As shown in FIG. 9, the standing portion 53 is formed as a part of the metal plate member 50 by a first molding metal mold 70 movable in an arrow A direction and a second molding metal mold 71 movable in an arrow B direction.

In the case where the standing portion 53 as in this embodiment is formed, when the metal plate member 50 is processed from the state of parts (c) of FIGS. 5 and 6 to the state of parts (d) of FIGS. 5 and 6, the metal plate member 50 is pressed by the first molding metal mold 70 from the plate surface 50a side of the metal plate member 50 and is bent at the third bending portion 53f so that the second molding metal mold 71 contacts the third plate portion 53e and the plate surface 50a, so that the standing portion 53 is formed. As a result, the metal plate member 50 can be bent 90° at the third bending portion 53f.

At this time, in order to process the third bending portion 50f, the second molding metal mold 71 is required to contact the third plate portion 53e, and therefore, is disposed in a projection plane of a flat surface of the first plate portion 53a with respect to the arrow A direction in FIG. 9 which is the inserting direction of the screw 62.

Accordingly, in the case where the metal plate member 50 is subjected to the above-described process, after the processing of the standing portion 53, the first molding metal mold 70 is extracted in the arrow A direction in FIG. 9 and the second molding metal mold 71 is extracted in the arrow B direction in FIG. 9, so that the metal plate member 50 can be demolded from the respective molding metal molds.

Next, the structure of the standing portion 53 including the female thread portion 51 in this embodiment and structures of standing portions 632 and 732 including female thread portions 631 and 731 in conventional examples will be described using FIGS. 10 and 11.

Parts (a) to (c9 of FIG. 10 are schematic views showing the standing portions 632 (conventional example 1), 53 (this embodiment) and 732 (conventional example 2). Part (a) of FIG. 10 is a front view of a metal plate member 630 in which the standing portion 632 including the female thread portion 631 in conventional example 1 is formed. Part (b) of FIG. 10 is a front view of the metal plate member 50 in which the standing portion 53 including the female thread portion 51 in this embodiment is formed. Part (c) of FIG. 10 is a front view of a metal plate member 730 in which the standing portion 732 including the female thread portion 731 in conventional example 2 is formed.

Parts (a) to (c) of FIG. 11 are top plan views relating to the respective standing portions of parts (a) to (c) of FIG. 10. Part (a) of FIG. 11 is the top plan view of the metal plate member 630 of part (a) of FIG. 10 in conventional example 1, part (b) of FIG. 11 is the top plan view of the metal plate member 50 of part (b) of FIG. 10 in this embodiment, and part (c) of FIG. 11 is the top plan view of the metal plate member 730 of part (c) of FIG. 10 in conventional example 2.

The standing portion 53 of parts (b) of FIGS. 10 and 11 in this embodiment has the same structure as the structure in First Embodiment described above, and therefore, the constituent portions are represented by the same reference numerals or symbols and will be omitted from description.

Compared with this embodiment, in conventional example 1 shown in parts (a) of FIGS. 10 and 11, the standing portion 632 is formed by being bent with respect to a plate surface 630a of the metal plate member 630.

In conventional example 1, a first plate portion 632a including the female thread portion 631 and a second plate portion 632c are bent 90° at a first bending portion 632c. Further, the second plate portion 632c and the plate surface 630a are bent 90° at a second bending portion 632d.

In conventional example 2 shown in parts (c) of FIGS. 10 and 11, the standing portion 732 is formed on a plate surface 730a of the metal plate member 730 by subjecting the metal plate member 730 to drawing.

In conventional example 2, with respect to a first plate portion 732a in which the female thread portion 731 is formed, a second plate portion 732b and a third plate portion 732c are subjected to the drawing so that the resultant standing portion 732 has a trapezoidal shape in cross-section. Accordingly, a first bending portion 732d is formed between the first plate portion 732a and the second plate portion 732b and a second bending portion 732e is formed between the second plate portion 732b and the plate surface 730a. Further, a third bending portion 732f is formed between the first plate portion 732a and the third plate portion 732c and a fourth bending portion 732g is formed between the third plate portion 732c and the plate surface 730a.

In the respective structures shown in parts (a) to (c) of FIGS. 10 and 11, in the case where the same force is exerted on the female thread portion, strength against the force received by the metal plate member is strongest in the case of part (c) of FIG. 10 (conventional example 2) and is second-strongest in the case of part (b) of FIG. 10 (this embodiment). In the case of part (a) of FIG. 10 (conventional example 1), the strength is weakest among the three structures shown in parts (a) to (c) of FIG. 10. Accordingly, the strength when the screw is fastened to the female thread portion is strongest in the case of part (c) of FIG. 10, is second-strongest in the case of part (b) of FIG. 10, and is weakest in the case of part (a) of FIG. 10 among the three structures shown in parts (a) to (c) of FIG. 10.

In conventional example 2 shown in parts (c) of FIGS. 10 and 11, a portion which most receives a force in the case where the force is exerted on the female thread portion 731 when the screw is fastened to the female thread portion 731 is the first plate portion 732a. Further, in conventional example 2, a constitution in which the first plate portion 732a which is the portion which most receives the force is supported by the second plate portion 732b and the third plate portion 732c is employed.

On the other hand, conventional example 1 shown in parts (a) of FIGS. 10 and 11, a portion which most receives a force in the case where the force is exerted on the female thread portion 631 when the screw is fastened to the female thread portion 631 is the second plate portion 632c.

In this embodiment shown in parts (b) of FIGS. 10 and 11, a portion which most receives a force in the case where the force is exerted on the female thread portion 51 when the screw is fastened to the female thread portion 631 is the third plate portion 53e.

From these differences, in conventional example 2, compared with conventional example 1 and this embodiment, the first plate portion 732a which is the portion which most receives the force is supported by the second plate portion 732b and the third plate portion 732c, and therefore, the strength is large.

Further, in the constitution of this embodiment, compared with the constitution of conventional example 1, the third plate portion 53e is positioned substantially at a center of the female thread portion 51, and therefore, in the case where the force is exerted on the female thread portion 51, the flat surface of the first plate portion 53a is not readily flexed in a direction crossing an extending direction thereof compared with that in conventional example 1.

On the other hand, in the constitution of conventional example 1, the first plate portion 632a is supported by the second plate portion 632c at an end portion thereof on the first bending portion 632b side. Accordingly, compared with this embodiment, in the case where the force is exerted on the first plate portion 632a, the first plate portion 632a is liable to flex in a direction of approaching the plate surface 630a at an end portion thereof opposite from the first bending portion 632b.

Incidentally, in the case where the standing portion 531 is formed by cutting away the metal plate member 630 as shown in part (a) o FIG. 11 in conventional example 1, a longitudinal length of a necessary cut-away portion 633 is L6, and thus a necessary length of the metal plate member 630 for processing the standing portion 531 is L6.

On the other hand, in the case where the standing portion 53 is formed by cutting away the metal plate member 50 as shown in part (b) o FIG. 11 in this embodiment, a longitudinal length of a necessary cut-away portion 52 is L7, and thus a necessary length of the metal plate member 50 for processing the standing portion 53 is L7.

Further, in the case where the standing portion 732 is formed by drawing the metal plate member 730 as shown in part (c) of FIG. 11 in conventional example 2, a length of the metal plate member 730 for processing the standing portion 732 is L8.

Here, a relationship among the respective lengths L6, L7 and L8 is L6<L7<L8 as shown in parts (a) to (c) of FIG. 11.

Accordingly, a necessary size of the metal plate member in the case where the standing portion is largest in conventional example 2 shown in parts (c) of FIGS. 10 and 11.

On the other hand, in this embodiment shown in parts (b) of FIGS. 10 and 11, a necessary size of the metal plate member in the case where the standing portion 53 is formed can be made smaller than the necessary size in conventional example 2. Further, according to the constitution of this embodiment, as described above, the strength can be made stronger than the strength in conventional example 1. Accordingly, according to the constitution of this embodiment, compared with conventional examples 1 and 2, by combining the hemming and the angular bending, it is possible to form the standing portion 53 having sufficient strength without enlarging a design space.

In the above-described constitution, a constitution in which the metal plate member 50 having a thickness of 0.6 mm is used was employed, but the constitution of this embodiment can be used when the thickness is not less than 0.6 mm and less than 1.2 mm. Further, a constitution in which the screw 62 having a nominal diameter of M3 was employed, but a constitution in which screws having nominal diameters M4 and M5 are used may also be employed when the female thread portion can be formed in the metal plate member 50 and the screws have a size such that the screws can be fastened to the female thread portion.

In the above-described constitution, the structure in which the direction of the rectilinear line connecting the pair of second bending portions 53d1 and 53d2 is parallel to a bending position of the first bending portion 53b and is parallel to a bending position of the third bending portion 53e was described. However, a constitution in which the second bending portions 53d1 and 53d2 are bent so that the rectilinear line connecting the second bending portions 53d1 and 53d2 are inclined in a degree larger than that in First Embodiment may also be employed. At this time, an inclination angle may preferably fall within a range of ±10°.

Incidentally, this inclination angle may most preferably be applied to First Embodiment, and may most preferably be set at a value close to 0° with respect to the rectilinear line connecting the second bending portions 53d1 and 53d2 in First Embodiment.

Also in this embodiment, the hole 54 and the second bending portions 53d1 and 53d2 sandwiching the hole 54 therebetween are provided, so that the first plate portion 53a in which the female thread portion 51 is provided can be supported at both ends of the female thread portion 51 with respect to the center of the female thread portion 51. Accordingly, the first plate portion 53a can be supported at the position crossing the center line of the female thread portion 51 with respect to the radial direction of the female thread portion 51, and therefore, it is possible to suppress deformation of the metal plate member 50 caused due to fastening of the screw 62.

Further, in the above, a constitution in which the burring of the first plate portion 53a is carried out from the plate surface 50a side of the metal plate member 50 toward the back surface side (opposite side) of the metal plate member 50 was employed. However, when a constitution in which the member-to-be-supported 50 can be fastened to the metal plate member 50 on the plate surface 50a side of the first plate portion 53a in which the female thread portion 51 is provided is employed, the metal plate member 50 may also be subjected to the burring from the back surface side toward the plate surface 50a side.

In the case of using this constitution, the screw hole 61 provided in the member-to-be-supported 60 is made larger than that in First Embodiment, whereby the plate surface of the member-to-be-supported 60 can be contacted to the plate surface of the first plate portion 53a while avoiding a portion projected from the flat surface by performing the burring. As a result, the member-to-be-supported 60 can be stably fixed to the metal plate member 50. In this case, the member-to-be-supported 60 can be stably fixed to the metal plate member 50 by making the diameter of the screw hole 61 larger than the diameter of the screw hole 61 used in First Embodiment at least by an amount corresponding to the thickness of the metal plate member 50.

Second Embodiment

Second Embodiment will be described using FIG. 12.

In this embodiment, the processing method of the standing portion 53 formed as the part of the metal plate member 50 of the assembling structure 500 in First Embodiment is changed, and a formed standing portion is different from the standing portion 53 in First Embodiment.

Parts (a) to (d) of FIG. 12 are schematic views showing a standing portion 83 formed as a part of a metal plate member 80 of an assembling structure 800 in this embodiment. Part (a) of FIG. 12 is a top plan view showing the standing portion 83 before processing. Part (b) of FIG. 12 is a top plan view showing the standing portion 83 after the processing. Part (c) of FIG. 12 is a front view showing the processed standing portion 83. Part (d) of FIG. 12 is a side view showing the processed standing portion 83.

In this embodiment, the assembling structure 800 is constituted by the metal plate member 80 as described above. Also in this embodiment, the thickness of the metal plate member 80 is 0.6 mm.

In a constitution shown in FIG. 12, the metal plate member 80 is provided with a cut-away portion 82 formed so that a portion inside the cut-away portion 82 is processed so as to project as a standing portion (rising portion) 83 from a plate surface 80a.

As shown in FIG. 12, the standing portion 83 is constituted by a first plate portion 83a, a first bending portion 83b, a second plate portion 83c, a pair of second bending portions 83d1 and 83d2, a pair of third plate portions 83e1 and 83e2, and a pair of third bending portions 83f1 and 83f2.

Further, in the first plate portion 83a of the standing portion 83, a female thread portion 81 formed by subjecting the metal plate member 80 to the burring and then by subjecting an inner periphery of a burred portion to cutting is provided.

The standing portion 83 in this embodiment is different from the standing portion in First Embodiment in that the two third plate portions 83e1 and 83e2 and the two third bending portions 83f1 and 83f2 are formed. However, the processing method such as hemming in this embodiment is similar to that in First Embodiment, as shown in part (c) of FIG. 11.

Accordingly, at the first bending portion 83b, so-called hemming such that the first plate portion 83a is bent 180° with respect to the second plate portion 83c so that the first plate portion 83a and the second plate portion 83c superposedly contact each other is performed.

Then, the second bending portions 83d1 and 83d2 are subjected to bending so that the second plate portion 83c is bent 90° with respect to the third plate portions 83e1 and 83e2.

Further, the third bending portions 83f1 and 83f2 are processed so as to bend the third plate portions 83e1 and 83e2 with respect to the plate surface 80a. The third bending portions 83f1 and 83f2 are processed so that the third plate portions 83e1 and 83e2 are bent 90° from the plate surface 80a.

As shown in part (b) and (d) of FIG. 12, in this embodiment, with respect to the first plate portion 83a, the pair of second plate portions 83e1 and 83e2 extends in the direction in which these portions are spaced from the first plate portion 83a and are also spaced from each other with respect to an arrow X direction shown in part (a) of FIG. 12. Accordingly, the pair of third bending portions 83f1 and 83f2 at which the pair of third plate portions 83e1 and 83e2 are bent 90° with respect to the plate surface 80a is also provided at two positions where these portions are spaced from the first plate portion 83a and are spaced from each other with respect to the arrow X direction. Further, the second bending portions 83d1 and 83d2 at which the third plate portions 83e1 and 83e2 are bent 90° with respect to the second plate portion 83c are also provided at two positions.

By employing this constitution, as shown in parts (b) and (d) of FIG. 12, when the standing portion 83 is seen from above, the third bending portions 83f1 and 83f2 are formed outside a projection plane of the first plate portion 83a with respect to the screw inserting direction of the female thread portion 81.

Accordingly, a hole 84 in Second Embodiment is formed so as to be larger than the hole 54 in First Embodiment.

Further, also in a constitution of this embodiment, the second bending portions 83d1 and 83d2 are provided at positions so that a rectilinear line connecting the second bending portions 83d1 and 83d2 pass through a center of the female thread portion 81 with respect to a radial direction of the female thread portion 81. By employing this constitution, when a screw is fastened, the first plate portion 83a provided with the female thread portion 81 is supported by the third plate portions 83e1 and 83e2.

Also by employing this constitution, when the screw is fastened to the female thread portion 81, the female thread portion 81 can be supported with respect to the screw inserting direction in which a force by fastening with the screw is exerted on the metal plate member 80, so that the metal plate member 80 can be prevented from being flexed and deformed during the fastening thereof with the screw.

Accordingly, also in Second Embodiment, even in the case where a thin metal plate member is used, deformation of the metal plate member due to fastening of the screw is suppressed, so that a lowering in positional accuracy of mounting component parts can be suppressed.

Next, a processing method of the metal plate member 80 in Second Embodiment will be described using parts (a) and (b) of FIG. 13.

Parts (a) and (b) of FIG. 13 are schematic views for illustrating the processing method of the metal plate member 80 in this embodiment, in which part (a) of FIG. 13 is a front view of the metal plate member 80 after processing, and part (b) of FIG. 13 is a top plan view of the metal plate member 80 shown in part (a) of FIG. 13.

As shown in FIG. 13, the standing portion 83 is formed as a part of the metal plate member 80 by a first molding metal mold 700 and a second molding metal mold 710.

In the case where the third bending portions 83f1 and 83f2 of the standing portion 83 as in this embodiment is formed, the metal plate member 80 is pressed by the first molding metal mold 700 from a direction of opposing the plate surface 80a of the metal plate member 80 and is bent so that the second molding metal mold 710 contacts the third plate portions 83e1 and 83e2 and the plate surface 80a, so that the standing portion 83 is formed. As a result, the metal plate member 80 can be bent 90° at the third bending portions 83f1 and 83f2.

In this embodiment, different from First Embodiment, the third bending portions 83f1 and 83f2 are formed outside the projection plane of the first plate portion 83a with respect to the screw inserting direction of the female thread portion 81.

Accordingly, after the processing of the third bending portions 83f1 and 83f2 of the standing portion 83, the first molding metal mold 700 and the second molding metal mold 710 are extracted in the arrow A direction in FIG. 13, so that the metal plate member 80 can be demolded from the respective molding metal molds.

For that reason, in the constitution of this embodiment, different from First Embodiment, the plurality of molding metal molds can be extracted from the same direction, and therefore, a structure of the molding metal molds can be made simpler than the structure in which the plurality of molding metal molds are extracted from different directions.

As described above, according to the constitution of First Embodiment or Second Embodiment, even in the case where the thin metal plate member is used, deformation of the metal plate member due to fastening of the screw is suppressed, so that a lowering in positional accuracy of mounting component parts can be suppressed.

In the above-described embodiments, the assembling structure used in the image forming apparatus was described, but the present invention is also applicable to other devices such as a feeding device for feeding a sheet or an original, a sheet processing device for subjecting sheets to a binding processing, a punching processing or the like, an image reading device for reading an image of the original or the like.

According to the present invention, deformation of the metal plate member due to the force exerted on the female thread portion in the screw inserting direction during the fastening of the screw is suppressed, so that breakage of the female thread portion caused by fastening the screw and the female thread portion in an inclined state can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-202139 filed on Oct. 18, 2017, which is hereby incorporated by reference herein in its entirety.

What is claimed is:

1. A supporting member made of a single metal plate member for supporting a member-to-be-supported by being fastened with a screw, said supporting member comprising:
    a first plate portion including a supporting surface for supporting the member-to-be-supported, a first hole formed by burring, and a female thread portion formed at an inner peripheral surface of said first hole so that the screw for fixing the member-to-be-supported is threadably engageable with said female thread portion;
    a second plate portion provided by hemming said metal plate member so that one surface of said second plate portion contacts a surface of said first plate portion opposite from said supporting surface;
    a third plate portion provided by bending said metal plate member at one end portion of said second plate portion so that an angle formed between said second plate portion and said third plate portion is substantially a right angle; and
    a second hole continuing between said second plate portion and said third plate portion so that the screw threadably engageable with said female thread portion is prevented from interfering with said second plate portion and said third plate portion,
    wherein said second plate portion and said third plate portion provide a bent portion therebetween positioned within a range of a nominal diameter of said female thread portion with respect to a thickness direction of said third plate portion, as seen in a direction perpendicular to the thickness direction.

2. A supporting member according to claim 1, wherein said bent portion between said second plate portion and said third plate portion is bent at the same position as a center of said female thread portion with respect to the plate thickness direction of said third plate portion, as seen in a direction perpendicular to the thickness direction.

3. A supporting member according to claim 1, wherein said third plate portion is formed by being bent substantially at a right angle from a base portion of said metal plate member.

4. A supporting member according to claim 3, wherein said third plate portion and said base portion provide a bent portion formed by being bent from said base portion outside a projection surface of said first plate portion with respect to the plate thickness direction of the first plate portion.

5. A supporting member according to claim 1, wherein said first plate portion and said second plate portion provide a bent portion extending in a direction parallel to an extending direction of a bent portion between said second plate portion and said third plate portion.

6. A supporting member according to claim 3, wherein said second plate portion and said third plate portion provide a bent portion extending in a direction parallel to an extending direction of a bent portion between said third plate portion and said base portion.

7. A supporting member according to claim 1, wherein said first plate portion, said second plate portion and said third plate portion are formed by integrally cutting away said metal plate member.

8. A supporting member according to claim 1, wherein said bent portion between said second plate portion and said third plate portion contacts said first plate portion on a rectilinear line passing through said female thread portion.

9. A supporting member according to claim 1, wherein said second hole is formed so that said second plate portion contacts said first plate portion while avoiding said female thread portion.

10. A supporting member according to claim 1, wherein said bent portion between said second plate portion and said third plate portion is formed by being bent so that said second plate portion is substantially at a right angle to said first plate portion.

11. An image forming apparatus comprising:
    image forming means configured to form an image on a recording material; and
    a supporting member made of a single metal plate member for supporting a member-to-be-supported by being fastened with a screw, said supporting member comprising,
    a first plate portion including a supporting surface for supporting the member to be supported, a first hole formed by burring, and a female thread portion formed at an inner peripheral surface of said first hole so that the screw for fixing the member to be supported is threadably engageable with said female thread portion;
    a second plate portion provided by hemming said metal plate member so that one surface of said second plate portion contacts a surface of said first plate portion opposite from said supporting surface;
    a third plate portion provided by bending said metal plate member at one end portion of said second plate portion so that an angle formed between said second plate portion and said third plate portion is substantially a right angle; and
    a second hole continuing between said second plate portion and said third plate portion so that the screw threadably engageable with said female thread portion is prevented from interfering with said second plate portion and said third plate portion,
    wherein said second plate portion and said third plate portion provide a bent portion therebetween positioned within a range of a nominal diameter of said female thread portion with respect to a thickness direction of said third plate portion, as seen in a direction perpendicular to the thickness direction.

12. An image forming apparatus according to claim 11, further comprising,
    a control substrate configured to control said image forming apparatus, and
    a cover member configured to cover said control substrate,
    wherein said cover member is fixed to said supporting member with the screw.

13. A sheet feeding device comprising:
    feeding means configured to feed a sheet; and
    a supporting member made of a single metal plate member for supporting a member-to-be-supported by being fastened with a screw, said supporting member comprising:
    a first plate portion including a supporting surface for supporting the member to be supported, a first hole formed by burring, and a female thread portion formed at an inner peripheral surface of said first hole so that the screw for fixing the member to be supported is threadably engageable with said female thread portion;

a second plate portion provided by hemming said metal plate member so that one surface of said second plate portion contacts a surface of said first plate portion opposite from said supporting surface;

a third plate portion provided by bending said metal plate member at one end portion of said second plate portion so that an angle formed between said second plate portion and said third plate portion is substantially a right angle; and a second hole continuing between said second plate portion and said third plate portion so that the screw threadably engageable with said female thread portion is prevented from interfering with said second plate portion and said third plate portion, wherein said second plate portion and said third plate portion provide a bent portion therebetween positioned within a range of a nominal diameter of said female thread portion with respect to a thickness direction of said third plate portion, as seen in a direction perpendicular to the thickness direction.

14. A sheet processing device comprising:

sheet processing means configured to process a sheet; and a supporting member made of a single metal plate member for supporting a member-to-be-supported by being fastened with a screw, said supporting member comprising:

a first plate portion including a supporting surface for supporting the member to be supported, a first hole formed by burring, and a female thread portion formed at an inner peripheral surface of said first hole so that the screw for fixing the member to be supported is threadably engageable with said female thread portion;

a second plate portion provided by hemming said metal plate member so that one surface of said second plate portion contacts a surface of said first plate portion opposite from said supporting surface;

a third plate portion provided by bending said metal plate member at one end portion of said second plate portion so that an angle formed between said second plate portion and said third plate portion is substantially a right angle; and a second hole continuing between said second plate portion and said third plate portion so that the screw threadably engageable with said female thread portion is prevented from interfering with said second plate portion and said third plate portion, wherein said second plate portion and said third plate portion provide a bent portion therebetween positioned within a range of a nominal diameter of said female thread portion with respect to a thickness direction of said third plate portion, as seen in a direction perpendicular to the thickness direction.

15. An image reading device comprising:

image reading means configured to read an image; and a supporting member made of a single metal plate member for supporting a member-to-be-supported by being fastened with a screw, said supporting member comprising:

a first plate portion including a supporting surface for supporting the member to be supported, a first hole formed by burring, and a female thread portion formed at an inner peripheral surface of said first hole so that the screw for fixing the member to be supported is threadably engageable with said female thread portion;

a second plate portion provided by hemming said metal plate member so that one surface of said second plate portion contacts a surface of said first plate portion opposite from said supporting surface;

a third plate portion provided by bending said metal plate member at one end portion of said second plate portion so that an angle formed between said second plate portion and said third plate portion is substantially a right angle; and a second hole continuing between said second plate portion and said third plate portion so that the screw threadably engageable with said female thread portion is prevented from interfering with said second plate portion and said third plate portion, wherein said second plate portion and said third plate portion provide a bent portion therebetween positioned within a range of a nominal diameter of said female thread portion with respect to a thickness direction of said third plate portion, as seen in a direction perpendicular to the thickness direction.

* * * * *